United States Patent
Ahmad et al.

(10) Patent No.: US 12,278,047 B1
(45) Date of Patent: Apr. 15, 2025

(54) SELF-SULFUR DOPED CARBON ELECTRODES DERIVED FROM POLY-ANTHRAQUINONE SULFIDE FOR SUPERCAPACITORS

(71) Applicants: KING FAHD UNIVERSITY OF PETROLEUM AND MINERALS, Dhahran (SA); KING ABDULLAH CITY FOR ATOMIC & RENEWABLE ENERGY (K.A. CARE), Riyadh (SA)

(72) Inventors: Aziz Ahmad, Dhahran (SA); Sami Ullah, Dhahran (SA); Sardaraz Khan, Dhahran (SA); Safyan Akram Khan, Dhahran (SA)

(73) Assignees: KING FAHD UNIVERSITY OF PETROLEUM AND MINERALS, Dhahran (SA); KING ABDULLAH CITY FOR ATOMIC & RENEWABLE ENERGY (K.A. CARE), Riyadh (SA)

( * ) Notice: Subject to any disclaimer, the term of this patent is extended or adjusted under 35 U.S.C. 154(b) by 0 days.

(21) Appl. No.: 18/818,549

(22) Filed: Aug. 28, 2024

(51) Int. Cl.
| | |
|---|---|
| *H01G 11/34* | (2013.01) |
| *H01G 11/36* | (2013.01) |
| *H01G 11/48* | (2013.01) |
| *H01G 11/52* | (2013.01) |
| *H01G 11/60* | (2013.01) |

(Continued)

(52) U.S. Cl.
CPC ............ *H01G 11/34* (2013.01); *H01G 11/36* (2013.01); *H01G 11/48* (2013.01); *H01G 11/52* (2013.01); *H01G 11/60* (2013.01); *H01G 11/62* (2013.01); *H01G 11/86* (2013.01)

(58) Field of Classification Search
None
See application file for complete search history.

(56) References Cited

U.S. PATENT DOCUMENTS

| | | | |
|---|---|---|---|
| 9,698,213 B1 * | 7/2017 | Yang | H01L 21/76843 |
| 9,806,018 B1 * | 10/2017 | Clevenger | H01L 21/76879 |

(Continued)

FOREIGN PATENT DOCUMENTS

| | | | |
|---|---|---|---|
| CN | 110011001 A | 7/2019 | |
| DE | 102012022688 A1 * | 5/2014 | H01G 4/005 |

(Continued)

OTHER PUBLICATIONS

Rashid Iqbal et al.: "A High Energy Density Self-supported and Bendable Organic Electrode for Redox Supercapacitors with a Wids Voltage Window", Chinese Journal of Polymer Science, vol. 38, Feb. 27, 2020, pp. 522-530.

(Continued)

*Primary Examiner* — Dion R. Ferguson
(74) *Attorney, Agent, or Firm* — Oblon, McClelland, Maier & Neustadt, L.L.P.

(57) ABSTRACT

A supercapacitor including a negative electrode, a positive electrode, an electrolyte, and a separator. The separator is between the negative electrode and the positive electrode, and the electrolyte is present in and on the separator. The negative electrode and the positive electrode include a carbon material selected from a poly-anthraquinone sulfide activated carbon material and a poly-anthraquinone sulfide reduced activated carbon material.

20 Claims, 21 Drawing Sheets

(51) Int. Cl.
*H01G 11/62* (2013.01)
*H01G 11/86* (2013.01)

(56) References Cited

U.S. PATENT DOCUMENTS

| | | | |
|---|---|---|---|
| 10,985,373 | B2 | 4/2021 | Pan et al. |
| 11,316,191 | B2 | 4/2022 | Kovacs et al. |
| 11,791,456 | B2 | 10/2023 | Choi et al. |
| 2013/0328026 | A1* | 12/2013 | Bhansali ............... H01G 4/18 257/40 |
| 2020/0165142 | A1* | 5/2020 | Jung ..................... H01G 4/10 |

FOREIGN PATENT DOCUMENTS

| | | |
|---|---|---|
| KR | 10-2021-0032637 A | 3/2021 |
| WO | WO-2020028702 A1 * | 2/2020 |

OTHER PUBLICATIONS

K.C. Seetha Lakismi et al.; "Tailor-made organic polymers towards high voltage aqueous ammonium/potassium-ion asymmetric supercapacitors", Applied Surface Science, vol. 577, Mar. 1, 2022, 151918, 3 pages.

* cited by examiner

SELF-SULFUR DOPED CARBON ELECTRODES DERIVED FROM POLY-ANTHRAQUINONE SULFIDE FOR SUPERCAPACITORS

BACKGROUND

Technical Field

The present disclosure is directed to carbon electrodes, particularly to a self-sulfur-doped carbon electrode derived from poly-anthraquinone sulfide for supercapacitors.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Storing energy, through devices such as batteries and supercapacitors (SCs), contributes to advancing renewable energy sources such as solar, wind, and geothermal energy. To sustain modern society's energy growth, energy conversion and storage are important. This is evident from the International Energy Agency's (IEA) report in 2021, which states that global energy demand increases by 2.1% each year. With the increasing demand in the market for a wide range of portable electronic devices that require more power, energy storage sources with excellent performance are highly demanded. SCs, also referred to as electric double-layer capacitors (EDLCs) have gained recognition as energy-storing devices for high-power output utilization owing to their fast charging and discharging capabilities, impressive power density, and long stability.

EDLCs store energy electrostatically in the interfaces between the electrodes. Furthermore, SCs can complement batteries for the achievement of high-power output within an exceptionally brief duration. Materials made of carbon have been utilized widely in EDLCs as electrodes due to their changeable pore size, high mechanical properties, excellent thermal stability, and high specific surface area. Carbon materials obtained from conventional means such as oil, natural gas, and coal have historically dominated global energy consumption, providing reliable and abundant energy; however, the widespread dependence on fossil fuels has raised environmental concerns as fossil fuel combustion contributes to climate change by releasing greenhouse gases into the atmosphere, causing air pollution and adverse health effects. In contrast to conventional sources, activated carbon derived from biomass stands as sustainable, structurally permeable, abundantly available, and cost-effective. Activated carbon is mainly derived from organic biomass such as chicken eggshells, peanut shells, rice husks, date seeds, bacterial cellulose, cassava peel waste, sludge biowaste from paper pulp mills, coffee beans, and the like. Using these materials is a consideration in SC applications due to their cost-effectiveness, which can be transformed into valuable high-added-value products. Furthermore, the microcrystalline structure provides ample storage sites, facilitating ion adsorption and enabling easy electrolyte ion insertion and de-insertion.

Biomass is considered an eco-friendly choice for fabricating electrodes for high-performing and efficient SCs because of its sustainability and low cost; however, a drawback associated with diverse biomass sources is their varying structures, which means that the ideal conditions used to create activated carbons from one source may not necessarily apply when synthesizing it from another source. Additionally, when using identical types of biomass sources on different occasions, modifications in synthesis conditions are needed due to the changes occurring in its structure. Therefore, it is beneficial to use basic materials with a repeatable structure and a consistent composition. Carbon doped with sulfur has gained attention for its distinct properties, for example surface wettability by electrolytes, induced pseudo-capacitance, and improved conductivity.

Sulfur-doped carbon has attracted interest in the SCs area due to its ability to improve the total energy density of the supercapacitor. The ability of the sulfur-doped carbon to rapidly store and discharge large amounts of electrical energy makes it particularly suitable for diverse applications, including advanced electronic devices, electric vehicles, hybrid electric vehicles, and the like. Moreover, chemically bonded sulfur-doped activated carbon can be used in organic electrolytes without dissolution. The surface chemistry of the carbon materials stands as one element among their many properties that plays a role in adjusting material characteristics to fulfill the demands across the energy storage field. Oxygen elements, such as chemisorbed carboxy groups, quinone groups, and the like, present on the exterior surface of carbon-based materials are known to lead to severe deterioration in both the coulombic efficiency and the lifespan of cycling as well as other electrochemical properties. Efforts have been made to eliminate oxygen functional groups through high-temperature thermal treatment, improving electrical conductivity; however, this leads to the rearrangement of the carbon structure at high temperatures and induces micropores to collapse, resulting in a decrease in ion storage. Additionally, stable groups like ethers, thioethers, and esters cannot be eliminated through thermal treatment, therefore mild hydrogen reduction of carbon materials is an additional process at low temperatures that can be used to avoid the complete structure collapse and eliminate a portion of an oxygen-containing functional group.

Although several carbon-based supercapacitors have been developed in the past, more efficient sulfur-doped carbon-based supercapacitors need to be fabricated and explored. Accordingly, an object of the present disclosure is to provide self-sulfur-doped carbon electrodes derived from poly-anthraquinone sulfide for materials in supercapacitors to overcome drawbacks in the art.

SUMMARY

In an exemplary embodiment, a supercapacitor is described. The supercapacitor includes a negative electrode including a carbon material and a substrate, wherein the carbon material is at least one selected from the group consisting of a poly-anthraquinone sulfide activated carbon material and a poly-anthraquinone sulfide reduced activated carbon material, and the carbon material is coated on the substrate, and the substrate is a metal foil. The supercapacitor includes a positive electrode including a carbon material and a substrate. The carbon material is at least one selected from the group consisting of a poly-anthraquinone sulfide activated carbon material and a poly-anthraquinone sulfide reduced activated carbon material. The carbon material is coated on the substrate, and the substrate is a metal foil. The supercapacitor further includes an electrolyte and a separator. The separator is between the negative electrode and the positive electrode, and the electrolyte is present in and on the separator.

In some embodiments, the poly-anthraquinone sulfide-activated carbon material is made by a process of mixing poly-anthraquinone sulfide with a base in water to form a mixture. The poly-anthraquinone sulfide and the base has a weight ratio of 1:1 to 1:10. The process further includes heating the mixture to a first temperature of 130 to 170° C. for 40 to 56 hours and then heating the mixture to a second temperature of 800 to 900° C. for 30 to 90 minutes in an inert environment to form the poly-anthraquinone sulfide activated carbon material.

In some embodiments, the poly-anthraquinone sulfide reduced activated carbon material is made by a process of heating the poly-anthraquinone sulfide activated carbon material at a temperature of 550 to 650° C. for 30 to 90 minutes in an environment of 85 to 95 percent argon and 5 to 15 percent hydrogen gas to form the poly-anthraquinone sulfide reduced activated carbon material.

In some embodiments, when the carbon material is poly-anthraquinone sulfide activated carbon material, and the substrate is an aluminum foil, the carbon material has a specific surface area of 2200 to 2250 m2/g.

In some embodiments, when the carbon material is poly-anthraquinone sulfide reduced activated carbon material, and the substrate is an aluminum foil, the carbon material has a specific surface area of 1850 to 1900 $m^2/g$.

In some embodiments, when the carbon material of the negative electrode and the positive electrode is poly-anthraquinone sulfide reduced activated carbon material, the substrate is an aluminum foil, the supercapacitor has a specific capacitance of 130 to 150 F/g at a current density of 15 to 25 A/g.

In some embodiments, when the carbon material of the negative electrode and the positive electrode is poly-anthraquinone sulfide activated carbon material, the substrate is an aluminum foil, the supercapacitor has a specific capacitance of 50 to 60 F/g at a current density of 15 to 25 A/g.

In some embodiments, when the carbon material of the negative electrode and the positive electrode is poly-anthraquinone sulfide reduced activated carbon material, the substrate is an aluminum foil, the supercapacitor retains 97 to 99% of an initial capacitance value after 20,000 charge and discharge cycles at a current density of 1 A/g.

In some embodiments, when the carbon material of the negative electrode and the positive electrode is poly-anthraquinone sulfide activated carbon material, the substrate is an aluminum foil, the supercapacitor retains 63 to 69% of an initial capacitance value after 20,000 charge and discharge cycles at a current density of 1 A/g.

In some embodiments, when the negative electrode and the positive electrode include the poly-anthraquinone sulfide reduced activated carbon material on an aluminum foil, the capacitor has a specific capacitance of 175 to 180 F/g at a current density of 0.5 A/g.

In some embodiments, when the negative electrode and the positive electrode include the poly-anthraquinone sulfide-activated carbon material on an aluminum foil, the capacitor has a specific capacitance of 170 to 175 F/g at a current density of 0.5 A/g.

In some embodiments, when the negative electrode and the positive electrode include the poly-anthraquinone sulfide reduced activated carbon material on an aluminum foil, the capacitor has an energy density of 40 to 50 Wh/kg at a power density of 410 W/kg.

In some embodiments, when the negative electrode and the positive electrode include the poly-anthraquinone sulfide-activated carbon material on an aluminum foil, the capacitor has an energy density of 40 to 50 Wh/kg at a power density of 350 W/kg.

In some embodiments, the electrolyte is a spiro-(1,1')-bipyrolidinium tetrafluoroborate in a propylene carbonate.

In some embodiments, the separator is a trilayered microporous membrane of polypropylene, polyethylene, and polypropylene.

In some embodiments, the negative electrode and the positive electrode further includes carbon black, a styrene butadiene, and a carboxymethyl cellulose.

In another exemplary embodiment, the method of making the negative electrode and the positive electrode is described. The process includes mixing the carbon material, carbon black, styrene butadiene, and carboxymethyl cellulose in water to form a paste. The carbon material is in an amount of 65 to 75 percent by weight, the carbon black is in an amount of 15 to 25 percent by weight, the styrene butadiene is in an amount of 2 to 8 percent by weight, and the carboxymethyl cellulose is in an amount of 5 to 15 percent by weight. The method further includes casting the paste on the substrate to form the negative electrode and the positive electrode. The substrate is an aluminum foil.

In some embodiments, the negative electrode and the positive electrode have the longest dimension of 10 to 12 mm.

In some embodiments, the poly-anthraquinone sulfide-activated carbon material is in the form of layered nanosheets having pores with an average diameter of 0.5 to 1.5 µm.

In some embodiments, the poly-anthraquinone sulfide reduced activated carbon material is in the form of layered nanosheets having pores with an average diameter of 0.2 to 0.8 µm.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternative and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
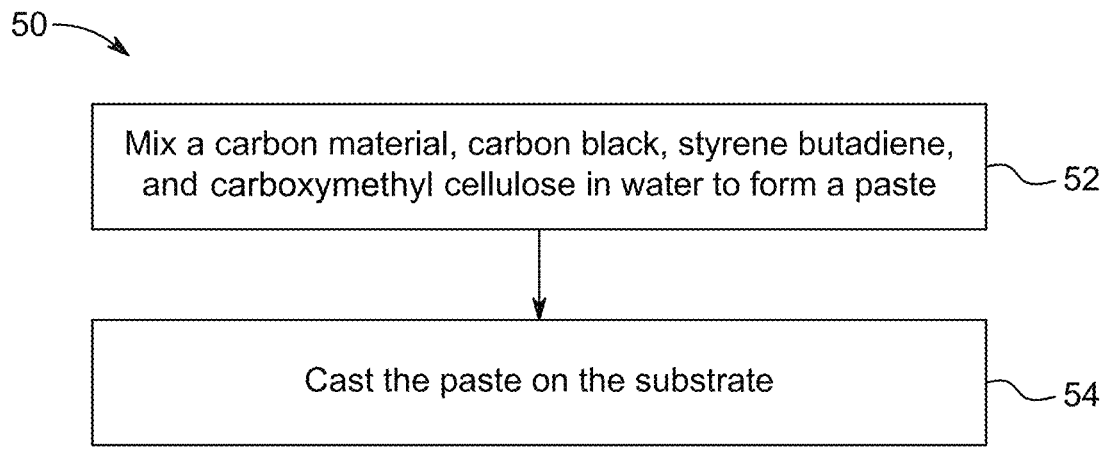
FIG. 1A is a flowchart of a method for making a negative electrode and a positive electrode, according to certain embodiments.

In the following description, it is understood that other embodiments may be utilized, and structural and operational changes may be made without departure from the scope of the present embodiments disclosed herein.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The use of the terms "include," "includes," "including," "have," "has," or "having" should be generally understood as open-ended and non-limiting unless specifically stated otherwise.

As used herein, "nanoparticles" are particles having a particle size of 1 nm to 500 nm within the scope of the present invention.

As used herein, the term "electrolyte" is a substance that forms a solution that can conduct electricity when dissolved in a polar solvent. The electrolyte is a medium containing ions that is electrically conductive through the movement of ions and not electrons.

As used herein, "particle size" and "pore size" may be thought of as the lengths or longest dimensions of a particle and of a pore opening, respectively.

As used herein, the term "room temperature" refers to a temperature in a range of 25° C.±3° C. in the present disclosure.

As used herein, the term "electrode" refers to an electrical conductor used to contact a non-metallic part of a circuit e.g., a semiconductor, an electrolyte, a vacuum, or air.

As used herein, the term "current density" refers to the amount of electric current traveling per unit cross-section area.

As used herein, the term "capacitance" refers to the capability of a material and/or device to store electric charge.

As used herein, the term "energy density" refers to the amount of energy stored in a supercapacitor per unit volume of supercapacitor.

As used herein, the term "power density" refers to the measure of power output per unit volume.

A percent by weight (wt. %) of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to self-sulfur-doped carbon electrodes derived from poly-anthraquinone sulfide for supercapacitors (SC). A chemical activation method is utilized to obtain activated carbon (C—KOH) from poly-anthraquinone sulfide (PAQS) at 850° C. The C—KOH is further used to obtain reduced activated carbon (C—KOH—H) by a mild reduction process at low temperatures. Experimental results demonstrate that C—KOH—H showed a better electrochemical performance in SCs than C—KOH. This attributed to the presence of sulfur and oxygen in less quantity than in the C—KOH. These results support that PAQS shows excellent activation with KOH to produce well-organized porous activated carbons with high surfaces, which can be utilized as high-performance electrode materials in supercapacitors and other energy-related applications.

A supercapacitor is described. The supercapacitor includes a negative electrode, a positive electrode, an electrocatalyst, and a separator. In some embodiments, the negative and positive electrodes comprise a carbon material and a substrate. The carbon material is at least one selected from the group consisting of a poly-anthraquinone sulfide activated carbon material and a poly-anthraquinone sulfide reduced activated carbon material. The carbon material is coated on the substrate. In an embodiment, the substrate is a metal foil. The metal foil may include one or more metals selected from aluminum, nickel, titanium, magnesium, sickle, steel, and the like, and/or combinations thereof. In a preferred embodiment, the metal is aluminum, and the substrate is an aluminum foil. In some embodiments, the substrate may be a metal mesh, a metal foam, a metal wire, and the like. In other embodiments, the substrate may be any conductive material known in the art, including, but not limited to, glassy carbon, carbon nanotubes, graphene, carbon cloth, carbon nanofibers, a polymer sponge, a hydrogel, a fibrous material such as paper, a textile, and the like. The coating is done on the surface of the substrate using a technique such as, but not limited to, a drop-casting method, spray coating, spin coating, dip coating, hydrothermal growth, aerosol-assisted chemical vapor deposition (AACVD), and any other technique known in the art.

In some embodiments, the negative electrode and the positive electrode have the longest dimension of 10-12 mm, preferably 10.2-11.8 mm, preferably 10.4-11.6 mm, more preferably 10.6-11.4 mm, and yet more preferably 10.8-11.2 mm. In a preferred embodiment, the negative electrode and the positive electrode have the longest dimension of about 11 mm. In some embodiments, the poly-anthraquinone sulfide activated carbon material is in the form of layered nanosheets having pores with an average diameter of 0.5-1.5 µm, preferably 0.6-1.4 µm, preferably 0.7-1.3 µm, preferably 0.8-1.2 µm, and preferably 0.9-1.1 µm. In a preferred embodiment, the poly-anthraquinone sulfide activated carbon material is in the form of layered nanosheets having pores with an average diameter of about 1.0 µm. In some embodiments, the pores of the poly-anthraquinone sulfide activated carbon material are separated by walls having a thickness of 10 to 100 nm, preferably 20 to 80 nm, preferably 30 to 70 nm, and preferably 40 to 60 nm. In some embodiments, the poly-anthraquinone sulfide reduced activated carbon material is in the form of layered nanosheets having pores with an average diameter of 0.2-0.8 µm, preferably 0.3-0.7 µm, and preferably 0.4-0.6 µm. In a preferred embodiment, the poly-anthraquinone sulfide reduced activated carbon material is in the form of layered nanosheets having pores with an average diameter of about 0.5 µm. In some embodiments, the pores of the poly-anthraquinone sulfide reduced activated carbon material are separated by walls having a thickness of 50 to 500 nm, preferably 100 to 400 nm, and preferably 200 to 300 nm. In alternate embodiments, the poly-anthraquinone sulfide activated carbon material and the poly-anthraquinone sulfide reduced activated carbon material may have different morphologies, such as nanowires, nanorods, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nanourchins, nanoflowers, and the like, and mixtures thereof.

FIG. 1A illustrates a flow chart of a method 50 of making the negative electrode and the positive electrode. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing a carbon material, carbon black, styrene butadiene, and carboxymethyl cellulose in water to form a paste. The carbon material is at least one selected from the group consisting of a poly-anthraquinone sulfide activated carbon material and a poly-anthraquinone sulfide reduced activated carbon material. In a preferred embodiment, the carbon material is poly-anthraquinone sulfide reduced activated carbon material. The mixing may be carried out manually or with the help of a stirrer. The water may be tap water, distilled water, bi-distilled water, deionized water, deionized distilled water, reverse osmosis water, and/or some other water. In a preferred embodiment, the water is deionized water. In some embodiments, the carbon material is in an amount of 65-75 percent by weight (wt. %), preferably 66-74 wt. %, preferably 67-73 wt. %, preferably 68-72 wt. %, more preferably 69-71 wt. %, and yet more preferably about 70 wt. %. . . . . In some embodiments, carbon black is in an amount of 15-25 wt. %, preferably 16-24 wt. %, preferably 17-23 wt. %, preferably 18-22 wt. %, more preferably 19-21 wt. %, and yet more preferably about 20 wt. %. In some embodiments, styrene butadiene is in an amount of 2-8 wt. %, preferably 3-7 wt. %, more preferably 4-6 wt. %, and yet more preferably about 5 wt. %. In some embodiments, carboxymethyl cellulose is in an amount of 5-15 wt. %, preferably 6-14 wt. %, preferably 7-13 wt. %, preferably 8-12 wt. %, more preferably 9-11 wt. %, and yet more preferably about 10 wt. %. In a preferred embodiment, the carbon material is in an amount of 70 wt. %, carbon black is in an amount of 20 wt. %, styrene butadiene is in an amount of 5 wt. %, and carboxymethyl cellulose is in an amount of 5 wt. %.

At step 54, the method 50 includes casting the paste on the substrate to form the negative electrode and the positive electrode. In some embodiments, the substrate is a metal foil. The metal foil may include one or more metals selected from aluminum, nickel, titanium, magnesium, sickle steel, and the like, and/or combinations thereof. In a preferred embodiment, the metal is aluminum, and the substrate is an aluminum foil. In some embodiments, the substrate is an aluminum foil. In some embodiments, the substrate is a carbon-coated aluminum foil. In a preferred embodiment, the paste is cast via the doctor blade on the aluminum foil.

Figure 1B:
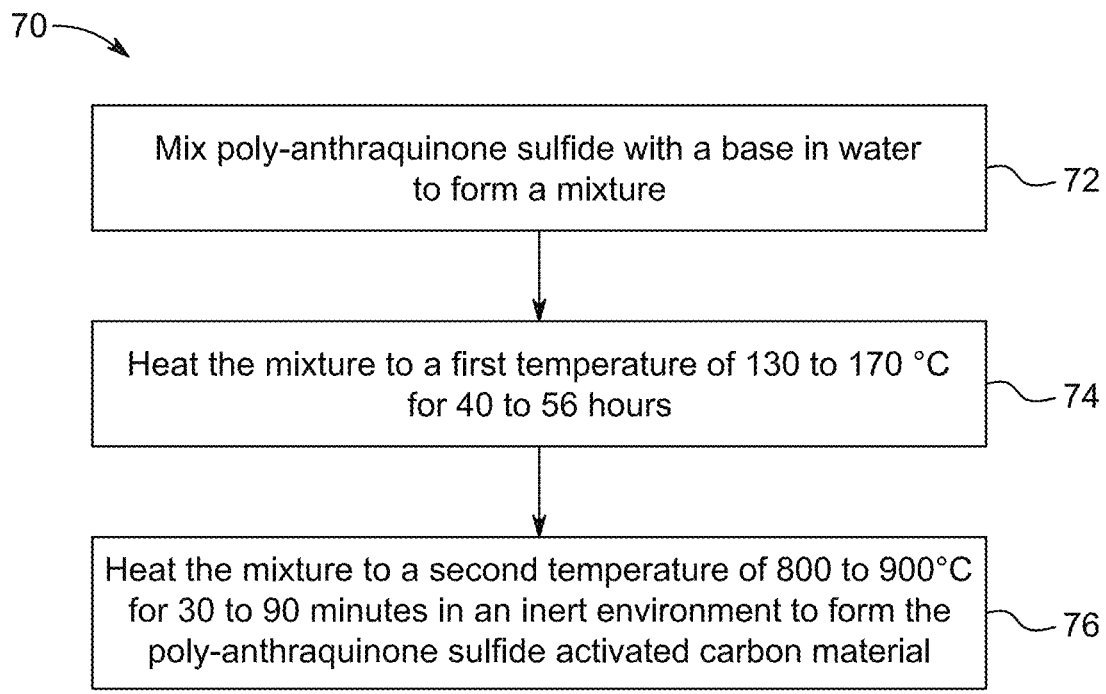
FIG. 1B is a flowchart of a method for making poly-anthraquinone sulfide (PAQS)-activated carbon material (C—KOH), according to certain embodiments.

FIG. 1B illustrates a flow chart of a method 70 of making a poly-anthraquinone sulfide activated carbon material. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes mixing poly-anthraquinone sulfide with a base in water to form a mixture. The base may be selected from the group consisting of an alkaline earth metal hydroxide, such as beryllium hydroxide ($Be(OH)_2$), magnesium hydroxide ($Mg(OH)_2$), strontium hydroxide ($Sr(OH)_2$), and calcium hydroxide ($Ca(OH)_2$), and an alkali metal hydroxide, such as lithium hydroxide (LiOH), sodium hydroxide (NaOH), potassium hydroxide (KOH) and rubidium hydroxide (RbOH), and cesium hydroxide (CsOH). In a preferred embodiment, the base is KOH. The water may be tap water, distilled water, bidistilled water, deionized water, deionized distilled water, reverse osmosis water, and/or some other water. In a preferred embodiment, the water is deionized water. The mixing may be carried out manually or with the help of a stirrer. In some embodiments, the poly-anthraquinone sulfide and the base have a weight ratio of 1:1-1:10, preferably 1:2-1:8, more preferably 1:3-1:6, and yet more preferably 1:4-1:5. In a preferred embodiment, the poly-anthraquinone sulfide and the base have a weight ratio of about 1:4.

At step 74, the method 70 includes heating the mixture to a first temperature of 130-170° C., preferably 135-165° C., more preferably 140-160° C., and yet more preferably 145-155° C. for 40-56 hours (h), preferably 41-55 h, preferably 42-54 h, preferably 43-53 h, preferably 44-52 h, preferably 45-51 h, more preferably 46-50 h, and yet more preferably 47-49 h. In a preferred embodiment, the method 70 includes heating the mixture to a first temperature of about 150° C. for about 48 h. The heating may be done using heating appliances such as hot plates, heating mantles ovens, microwaves, autoclaves, tapes, oil baths, salt baths, sand baths, air baths, hot-tube furnaces, hot-air guns, and the like. In a preferred embodiment, the heating is done in a hot air oven.

At step 76, the method 70 includes heating the mixture to a second temperature of 800-900° C., preferably 810-890° C., preferably 820-880° C., more preferably 830-870° C., and yet more preferably 840-860° C. for 30-90 minutes (min), preferably 35-85 min, preferably 40-80 min, preferably 45-75 min, more preferably 50-70 min, and yet more preferably 55-65 min in an inert environment to form the poly-anthraquinone sulfide activated carbon material. The inert environment is provided with the help of an inert gas. The inert gas may nitrogen, hydrogen, helium, argon, and the like. In a preferred embodiment, the inert gas is argon. In a preferred embodiment, the mixture is heated in a tubular furnace, preferably to a second temperature of about 850° C. for about 60 min.

In an embodiment, a method of making the poly-anthraquinone sulfide reduced activated carbon material is described. In some embodiments, the method includes heating the poly-anthraquinone sulfide activated carbon material at a temperature of 550-650° C., preferably 560-640° C., preferably 570-630° C., more preferably 580-620° C., and yet more preferably 590-610° C. for 30-90 min, preferably 35-85 min, preferably 40-80 min, preferably 45-75 min, more preferably 50-70 min, and yet more preferably 55-65 min in an environment of 85-95 percent (%) argon, preferably 86-93%, preferably 87-92%, more preferably 88-91%, and yet more preferably 89-90% argon and 5-15%, preferably 6-14%, preferably 7-13%, more preferably 8-12%, and yet more preferably 9-11% hydrogen gas to form the poly-anthraquinone sulfide reduced activated carbon material. In a preferred embodiment, the method includes heating the poly-anthraquinone sulfide activated carbon material at a temperature of 600° C. for 60 min in an environment of 90% argon and 10% hydrogen gas to form the poly-anthraquinone sulfide reduced activated carbon material.

The SC further includes an electrolyte. In an embodiment, the electrolyte is a spiro-(1,1')-bipyrolidinium tetrafluoroborate in a propylene carbonate. The spiro-(1,1')-bipyrolidinium tetrafluoroborate is present at a concentration of 0.05-5 molar (M), preferably 0.1-4.5 M, preferably 0.5-4.0 M, preferably 1.0-3.5 M, preferably 1.5-3.0 M, and preferably 2.0-2.5 M. In a preferred embodiment, the spiro-(1,1')-bipyrolidinium tetrafluoroborate is present at a concentration of 1 M. In alternate embodiments, the electrolyte may be sodium chloride, sodium bicarbonate, potassium bicarbonate, and/or other non-aqueous electrolytes like N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, ethyl propionate, and the like.

The SC further includes a separator. The separator is between the negative electrode and the positive electrode, and the electrolyte is present in and on the separator. The separator separates the anode from direct contact with the cathode. A suitable separator for an electrolyte should have high moisture retention ability and low resistance to electrolyte ion transfer. The separator further assists ionic conduction through the electrolyte, allowing the flow of charged ions during the passage of current. In some embodiments, the separator is a trilayered microporous membrane of polypropylene, polyethylene, and polypropylene. In alternate embodiments, the separator may be selected from glass fibers, polyester, Teflon, polytetrafluoroethylene (PTFE), other polymers, and the like, and combinations thereof.

In some embodiments, the carbon material is poly-anthraquinone sulfide activated carbon material and the substrate is an aluminum foil, and the carbon material has a specific surface area of 2200-2250 $m_2/g$, preferably 2210-2250 $m_2/g$, and more preferably 2220-2240 $m^2/g$. In a preferred embodiment, the carbon material has a specific surface area of about 2221 $m_2/g$. In some embodiments, the carbon material is poly-anthraquinone sulfide reduced activated carbon material and the substrate is an aluminum foil, and the carbon material has a specific surface area of 1850-1900 $m^2/g$, preferably 1860-1890 $m_2/g$, and more preferably 1870-1880 $m_2/g$. In another preferred embodiment, the carbon material has a specific surface area of about 1870 $m_2/g$.

In some embodiments, the carbon material of the negative electrode and the positive electrode is poly-anthraquinone sulfide reduced activated carbon material and the substrate is an aluminum foil, and the supercapacitor has a specific capacitance of 130-150 F/g, preferably 131-149 F/g, preferably 132-148 F/g, preferably 133-147 F/g, preferably 136-146 F/g, preferably 137-145 F/g, preferably 138-144 F/g, more preferably 139-143 F/g, and yet more preferably about 140-142 F/g at a current density of 15-25 A/g, preferably 16-24 A/g, preferably 17-23 A/g, preferably 18-22 A/g, and preferably 19-21 A/g. In a preferred embodiment, the supercapacitor has a specific capacitance of about 139 F/g at a current density of 20 A/g. In some embodiments, the carbon material of the negative electrode and the positive electrode is poly-anthraquinone sulfide activated carbon material and the substrate is an aluminum foil, the supercapacitor has a specific capacitance of the supercapacitor has a specific capacitance of 50-60 F/g, preferably 51-59 F/g, preferably 52-58 F/g, more preferably 53-57 F/g, and yet more preferably 54-56 F/g at a current density of 15-25 A/g, preferably 16-24 A/g, preferably 17-23 A/g, more preferably 18-22 A/g, and yet more preferably 19-21 A/g. In a preferred embodiment, when the carbon material of the negative electrode and the positive electrode is poly-anthraquinone sulfide activated carbon material and the substrate is an aluminum foil, the supercapacitor has a specific capacitance of about 54 F/g at a current density of 20 A/g.

In some embodiments, the carbon material of the negative electrode and the positive electrode is poly-anthraquinone sulfide reduced activated carbon material, the substrate is an aluminum foil, and the supercapacitor retains 97-99%, preferably 97.5-98.5% of an initial capacitance value after 20,000 charge and discharge cycles at a current density of 1 A/g. In a preferred embodiment, the carbon material of the negative electrode and the positive electrode is poly-anthraquinone sulfide reduced activated carbon material, the substrate is an aluminum foil, and the supercapacitor retains about 98% of an initial capacitance value after 20,000 charge and discharge cycles at a current density of 1 A/g. In some embodiments, the carbon material of the negative electrode and the positive electrode is poly-anthraquinone sulfide activated carbon material, the substrate is an aluminum foil, and the supercapacitor retains 63-69%, preferably 64-68%, and more preferably 65-67%, of an initial capacitance value after 20,000 charge and discharge cycles at a current density of 1 A/g. In a preferred embodiment, the carbon material of the negative electrode and the positive electrode is poly-anthraquinone sulfide activated carbon material, the substrate is an aluminum foil, and the supercapacitor retains about 66% of an initial capacitance value after 20,000 charge and discharge cycles at a current density of 1 A/g. In some embodiments, the negative electrode and the positive electrode comprise the poly-anthraquinone sulfide reduced activated carbon material on an aluminum foil and the capacitor has a specific capacitance of 175-180 F/g, preferably 176-179 F/g, and more preferably 177-178 F/g at a current density of 0.5 A/g. In a preferred embodiment, the negative electrode and the positive electrode comprise the poly-anthraquinone sulfide reduced activated carbon material on aluminum foil, and the capacitor has a specific capacitance of about 177 F/g at a current density of 0.5 A/g. In some embodiments, the negative electrode and the positive electrode comprise the poly-anthraquinone sulfide activated carbon material on an aluminum foil, and the capacitor has a specific capacitance of 170-175 F/g, preferably 171-174 F/g, and more preferably 172-174 F/g at a current density of 0.5 A/g. In another preferred embodiment, when the negative electrode and the positive electrode comprise the poly-anthraquinone sulfide activated carbon material on an aluminum foil, the capacitor has a specific capacitance of about 174 F/g at a current density of 0.5 A/g.

In some embodiments, the negative electrode and the positive electrode comprise the poly-anthraquinone sulfide activated carbon material on an aluminum foil, the capacitor has an energy density of 40-50 Wh/kg, preferably 41-49 Wh/kg, preferably 42-48 Wh/kg, more preferably 43-47 Wh/kg, and yet more preferably 44-46 Wh/kg at a power density of 410 W/kg. In a preferred embodiment, the negative electrode and the positive electrode comprise the poly-anthraquinone sulfide activated carbon material on an aluminum foil, the capacitor has an energy density of about 45 Wh/kg at a power density of 410 W/kg. In some embodiments, the negative electrode and the positive electrode comprise the poly-anthraquinone sulfide reduced activated carbon material on an aluminum foil, the capacitor has an energy density of 40-50 Wh/kg, preferably 41-49 Wh/kg, preferably 42-48 Wh/kg, more preferably 43-47 Wh/kg, and yet more preferably 44-46 Wh/kg at a power density of 350 W/kg. In a preferred embodiment, the negative electrode and the positive electrode comprise the poly-anthraquinone sulfide reduced activated carbon material on an aluminum foil, the capacitor has an energy density of about 44 Wh/kg at a power density of 350 W/kg.

EXAMPLES

The following examples demonstrate the preparation and use of self-sulfur-doped carbon electrodes derived from poly-anthraquinone sulfide for use in supercapacitors (SCs). The examples are provided solely for illustration and are not to be construed as limitations of the present disclosure, as many variations thereof are possible without departing from the spirit and scope of the present disclosure.

Example 1: Materials

Benzene ($C_6H_6$, 99.9%), 1,5-dichloroanthraquinone ($C_{14}H_6Cl_2O_2$, 98%), sodium sulfide nanohydrate ($Na_2S \cdot 9H_2O$, 98.5%), ethanol ($C_2H_6O$, 95%), and acetone ($C_2H_6O$, 99.5%) were ordered from the Beijing Chemical Plant. Aluminum foil was received from Good Fellow Cambridge Limited. Carbon black (Printex XE2) was provided by Alfa Aesar. Spiro-(1,1) bipyrrolidinium tetrafluoroborate (SBP-BF4) electrolyte of 1 molar (M) in propylene carbonate was supplied by the Beijing Institute of chemical reagent. Carboxymethyl cellulose (CMC) and styrene-butadiene rubber (SBR) were supplied by the Zibo Hailan Chemical Co., LTD.

Example 2: Synthesis of the Poly-Anthraquinone Sulfide (PAQS)

PAQS was synthesized by a method reported in the literature [Ahmad, A.; Imani, A.; Mao, L.; Iqbal, R.; Zhang, H.; Ghazi, Z. A.; Ahmad, R.; Khan, A. A.; Xie, L.; Chen, C.-M.; et al. A Bifunctional and Free-Standing Organic Composite Film with High Flexibility and Good Tensile Strength for Tribological and Electrochemical Applications. *Adv. Mater. Technol.* 2019, 4, 1900617, which is incorporated herein by reference in its entirety]. Briefly, sodium nanohydrate [$Na_2S \cdot 9H_2O$, (4.80 g, 0.02 mol)] was added to a reaction flask that consisted of 50 mL N-methyl-2-pyrrolidinone (NMP). To remove the crystalline water from sodium monohydrate, 50 mL of benzene was put into the reaction flask and an azeotropic mixture was made. The benzene was used as an entrainer/separating agent to remove the crystal water from the reaction mixture at 150° C. When the benzene and water were removed from the reaction mixture entirely, 1,5-dichloroanthraquinone [$C_{14}H_6Cl_2O_2$, 5.54 gram (g), 0.02 mole (mol)] was supplied to the solution that included anhydrous sodium sulfide nonahydrate. The reaction was placed overnight at 200° C. to form poly-anthraquinone sulfide. The synthesized PAQS was filtered and rinsed with hot distilled water and acetone under vacuum pressure to remove the unreacted monomers and oligomers. Afterward, the as-obtained polymer was dried overnight in the oven at 120° C. The resultant polymer was collected and exposed to calcination at 300° C. for 3 h to degrade the unreacted monomer and oligomers. The final calcined polymer was washed repeatedly with acetone and distilled water to remove the undesired impurities. The washed PAQS was heated in an oven at 120° C. and used to prepare activated carbons without further treatment.

Example 3: Preparation of C—KOH

A weight ratio of the PAQS to KOH (1:4) was used to prepare the activated carbon (AC) termed C—KOH. Initially, 4 g of the KOH and de-ionized water were added to the nickel crucible and stirred through a glass rod until a clear and transparent solution formed. In the next step, 1 g of the freshly prepared PAQS powder was added to the KOH solution in a ceramic crucible and agitated together to achieve a thick paste of the mixture. The thick paste mixture was kept in the oven at 150° C. for 48 hours to remove the water completely and achieve a completely dry mixture. After this process, the dried mixture was heated to 850° C. in an argon environment tube for 1 h with a cooling and heating speed of 3 degrees Celsius per minute (° C./min). The obtained activated carbon was collected and washed with hot distilled water repeatedly for 30 minutes under vacuum conditions. After that, the collected activated carbon was washed with 1 M HCl and de-ionized water repeatedly until a pH of about 7.0 was achieved. Lastly, the activated carbon was dried at 80° C. overnight. The amount of C—KOH collected after all these processes was 43%.

Example 4: Preparation of Reduced C—KOH—H from C—KOH

Figure 1C:
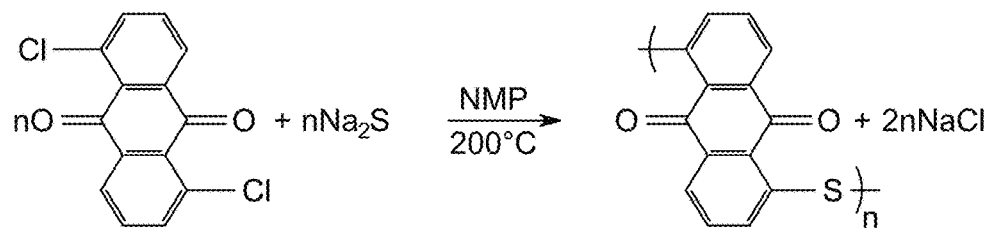
FIG. 1C illustrates a synthesis route of the PAQS, according to certain embodiments.
Figure 1D:
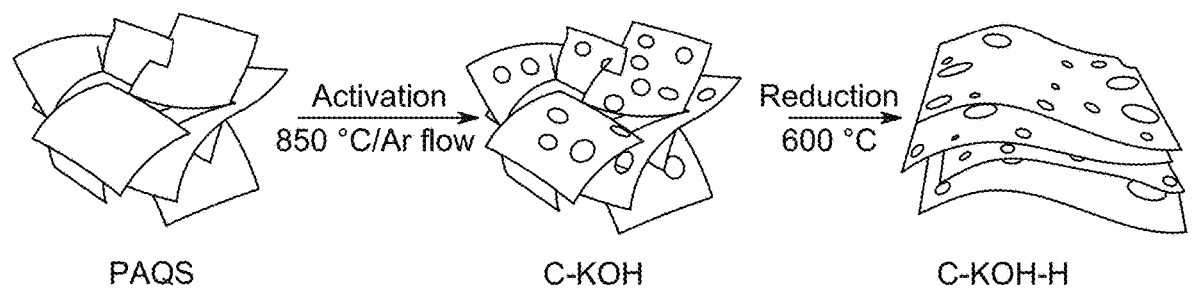
FIG. 1D is a schematic illustration depicting the preparation of activated carbon (C—KOH) and reduced activated carbon (C—KOH—H) from the PAQS, according to certain embodiments.

The desired quantity of C—KOH was taken in a ceramic boat and kept in a tube furnace. The C—KOH was heated to 600° C. for 1 h in a tube furnace with a flow of 90% argon and 10% $H_2$ mixture at a temperature change of 3° C./min during the heating and cooling. The obtained activated carbon, after reduction with the argon and hydrogen mixture, was washed with distilled water and dried in an oven at 80° C. The acquired reduced activated carbon is recognized by the C—KOH—H abbreviation. FIG. 1C depicts a synthesis route of the PAQS, and FIG. 1D depicts a schematic illustration of the C—KOH and C—KOH—H preparation from PAQS.

Example 5: Characterization

Transmission electron microscope (TEM 200 KV, Tecnai G20 STWIN) and field emission scanning electron microscope (FESEM, HITACHI SU8220) were used to capture the samples' morphologies and amorphous nature. X-ray diffraction (XRD, MiniFlex, and Rigaku) was utilized to investigate the characteristic peak position of the activated carbons. The diffractometer was operated utilizing 10 mA current, a voltage of 30 kV, and a wavelength of 0.15416 nm. At room temperature, Raman spectra of C—KOH and C—KOH—H were obtained through the use of a Raman spectroscopy approach (using a HORIBA iHR320 image spectrometer that was bundled with a CCD detector). To investigate the distribution of pore sizes and specific surface areas (SSA) by $N_2$ adsorption/desorption, Brunauer-Emmett-Teller (BET), an apparatus from Micromeritics, ASAP 2020 was used. Thermogravimetric analysis (TGA) technique was used to carry out stability measurements for C—KOH and C—KOH—H. A Pyris Diamond TGA/DTA machine manufactured by Perkin Elmer Instruments Co. Ltd. in the United States was used to perform the TGA. Fourier-transformed infrared (FTIR) spectra were recorded for C—KOH and C—KOH—H using a spectrometer made by Perkin-Elmer.

Example 6: Electrode Fabrication

The electrodes were fabricated in distilled water from 70 wt. % of the active materials (C—KOH and C—KOH—H), 20 wt. % carbon black (CB), 5 wt. % of the styrene butadiene, and 10 wt. % carboxy methyl cellulose (CMC). The thick aqueous homogeneous paste was prepared from the mixture and was cast via a doctor's blade on the aluminum foil. The casted electrode paste on the Al foil was kept for overnight drying in a vacuum oven at 80° C. Finally, dried electrodes were punched to obtain small slice-type electrodes of 11 mm in size.

Example 7: Electrochemical Measurements

Electrochemical tests were performed for the C—KOH and C—KOH—H in CR2032 coin cells. EDLCs were assembled, which included working electrodes, a separator made of celgard 2320, and electrolytes of 1 M quaternary ammonium spiro-(1,1')-bipyrolidinium tetrafluoroborate (SBP-BF4) dissolved in propylene carbonate (PC). The average mass of the C—KOH and the C—KOH—H electrodes was 1 mg, respectively. The C—KOH and the C—KOH—H were used to assemble the coin-type symmetric supercapacitor cell, respectively. To measure cyclic voltammetry (CV) and electrochemical impedance spectroscopy (EIS) for each sample, an electrochemical workstation (CHI 760D Chenhua Co., Ltd, Shanghai, China) was used. A land battery testing system was used to test the galvanostatic charge-discharge (GCD) curves. All electrochemical measurements of the assembled supercapacitors were measured at room temperature. The specific capacitance, energy density, and power density were calculated using the following equations:

$$C_s(F\ g^{-1}) = \frac{2 \times I \times \Delta t}{m \times \Delta V} \quad (1)$$

$$E_d(Wh\ kg^{-1}) = \frac{C \times \Delta V^2}{2 \times 4 \times 3.600} \quad (2)$$

$$P_d(W\ kg^{-1}) = \frac{E_d}{\Delta t} \times 3600 \quad (3)$$

The symbol "Cs" denotes specific capacitance expressed in Farad per gram (F/g), and "m" denotes the electrode's active mass in gram (g). The applied current is shown as "I" in amperes, while the discharge time difference is shown as "Δt" in seconds. Energy density and power density of the built symmetric SCs are denoted by the letters Ed and Pa, respectively. Watt hours per kilogram (Wh/kg) are used to express the Ed and watt per kilogram (W/kg) are used for Pd, respectively.

Example 8: Results and Discussion

Figure 2A:
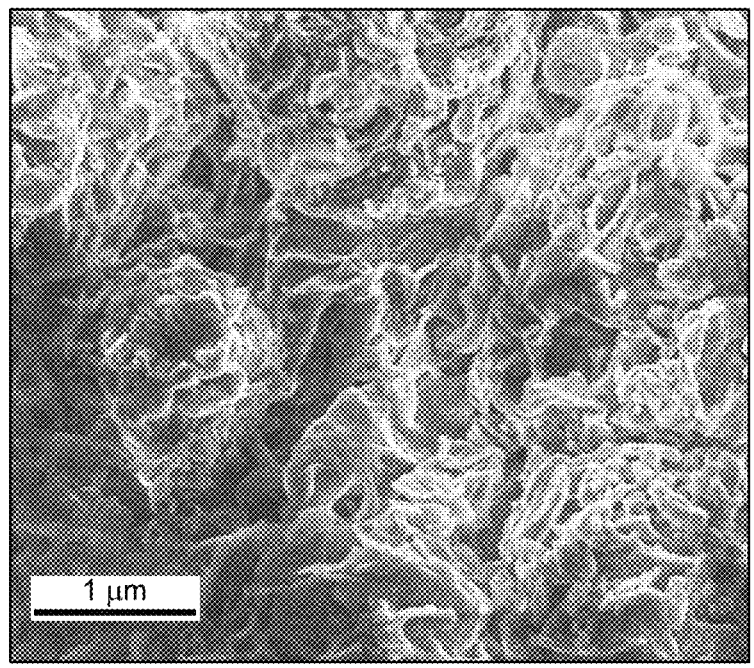
FIG. 2A shows a scanning electron microscopy (SEM) image of the PAQS, according to certain embodiments.
Figure 2B:
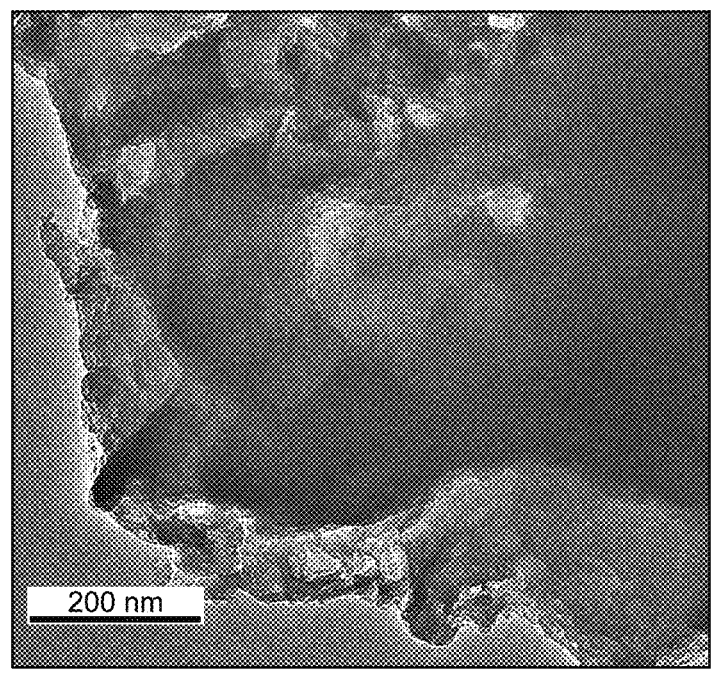
FIG. 2B shows a transmission electron microscopy (TEM) image of the PAQS, according to certain embodiments.
Figure 2C:
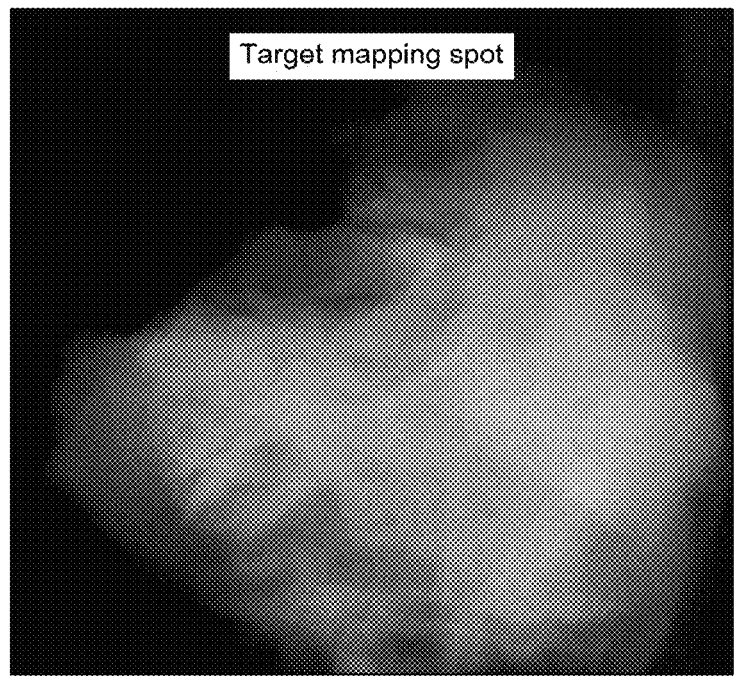
FIG. 2C shows a target mapping spot for elemental analysis of the PAQS, according to certain embodiments.
Figure 2D:
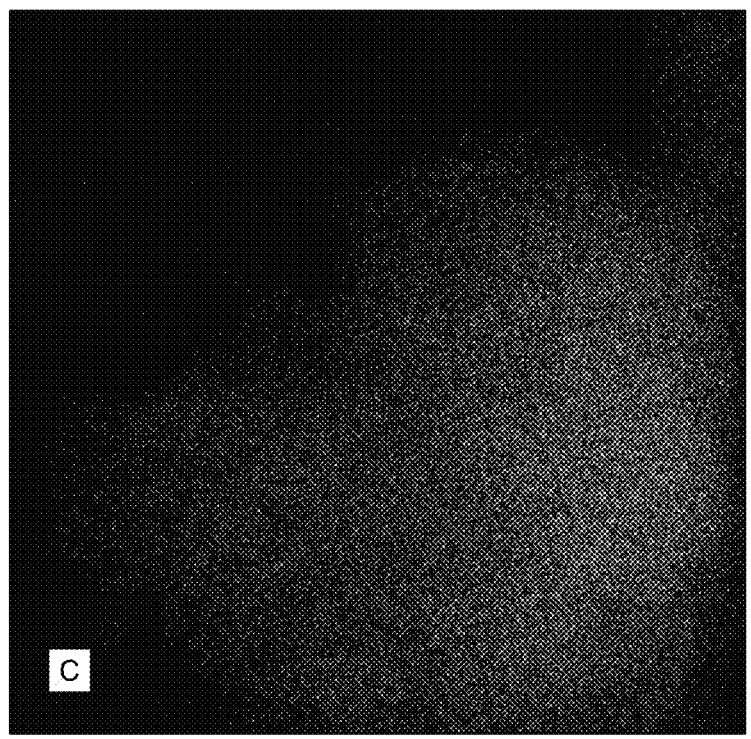
FIG. 2D shows an elemental mapping image for carbon (C) in the PAQS, according to certain embodiments.
Figure 2E:
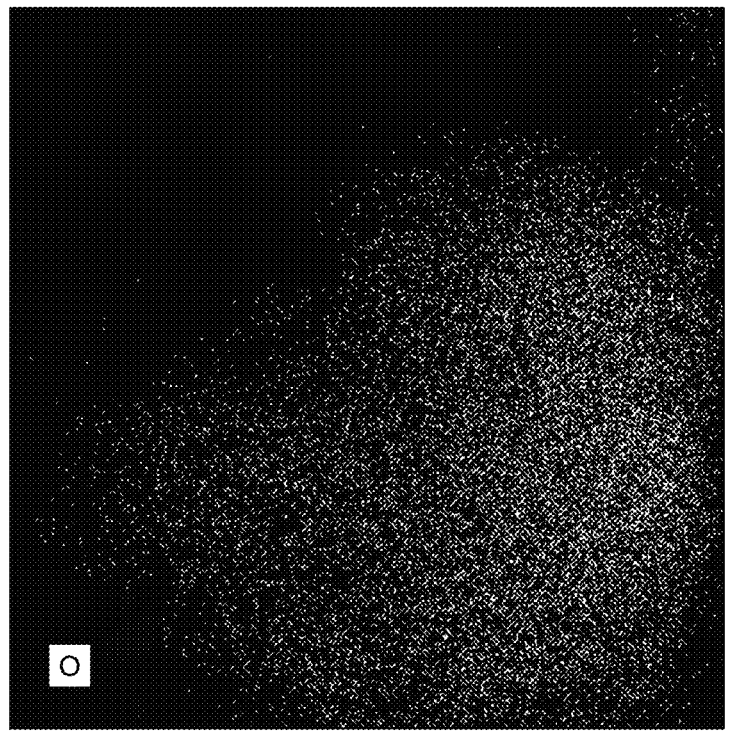
FIG. 2E shows an elemental mapping image for oxygen (O) in the PAQS, according to certain embodiments.
Figure 2F:
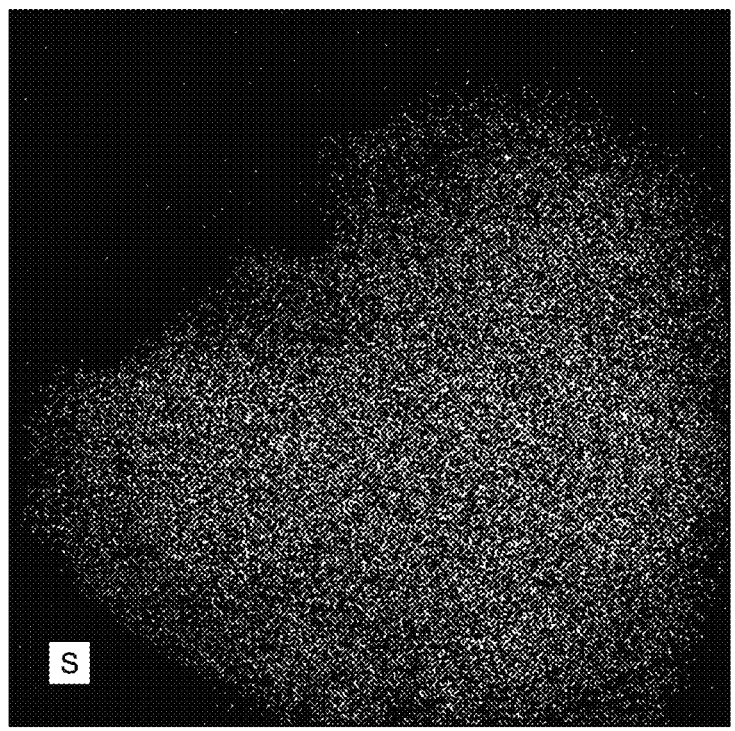
FIG. 2F shows an elemental mapping image for sulfur(S) in the PAQS, according to certain embodiments.

FESEM and HRTEM were used to investigate the surface morphologies and microstructures of the PAQS, C—KOH, and C—KOH—H, respectively. The pristine PAQS particles exhibited a flake-type morphology and stacking, as seen in FIG. 2A, with lengths of the stacked flakes varying from hundreds of nanometers to several micrometers. Moreover, PAQS have a flake-like morphology that consists of nanostructured sheets, as depicted in FIG. 2A. The flake PAQS morphology was further confirmed through HRTEM characterization (FIG. 2B). To investigate the elemental distribution of the materials, a specific location of the PAQS was targeted, and FIG. 2C shows a target mapping spot for elemental analysis of the PAQS. The spot elemental mapping analysis revealed the consistent distribution of the carbon (C), oxygen (O), and sulfur(S) elements in PAQS, as illustrated in FIGS. 2D-2F.

Figure 3A:
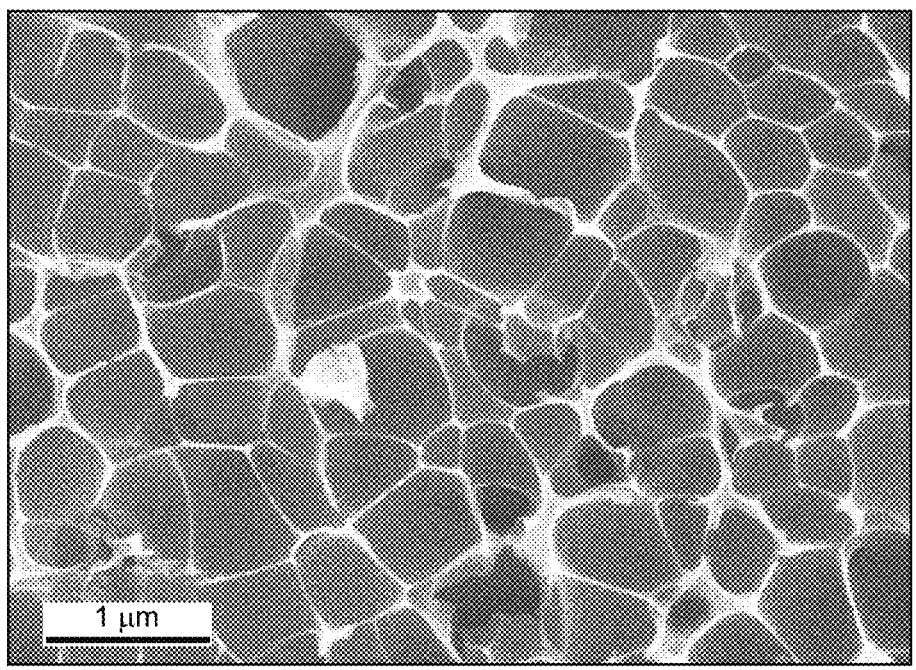
FIG. 3A shows an SEM image of the C—KOH at 1 μm magnification, according to certain embodiments.
Figure 3B:
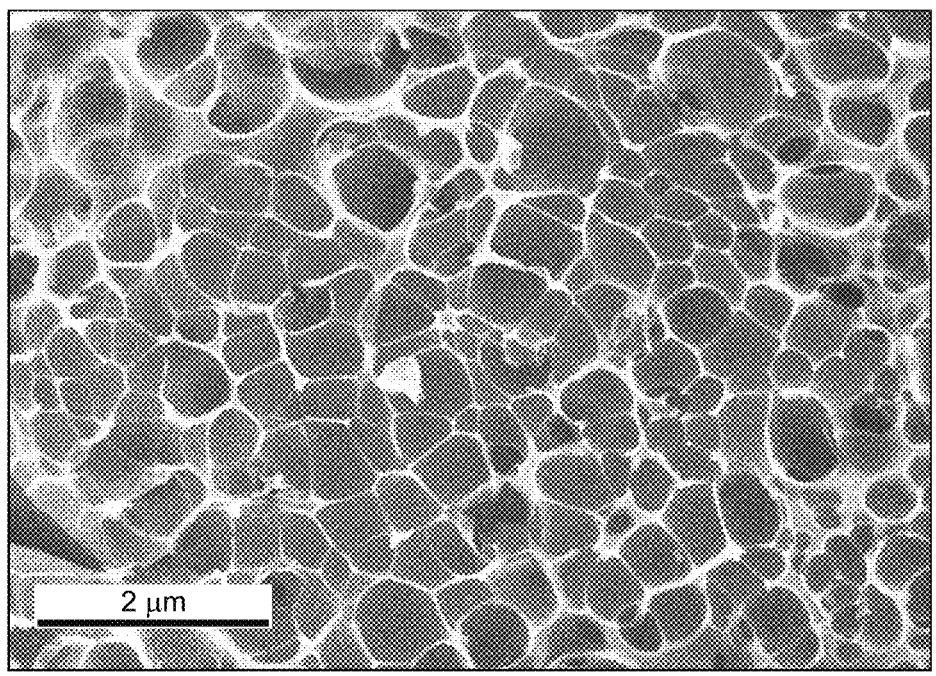
FIG. 3B shows an SEM image of the C—KOH at 2 μm magnification, according to certain embodiments.
Figure 3C:
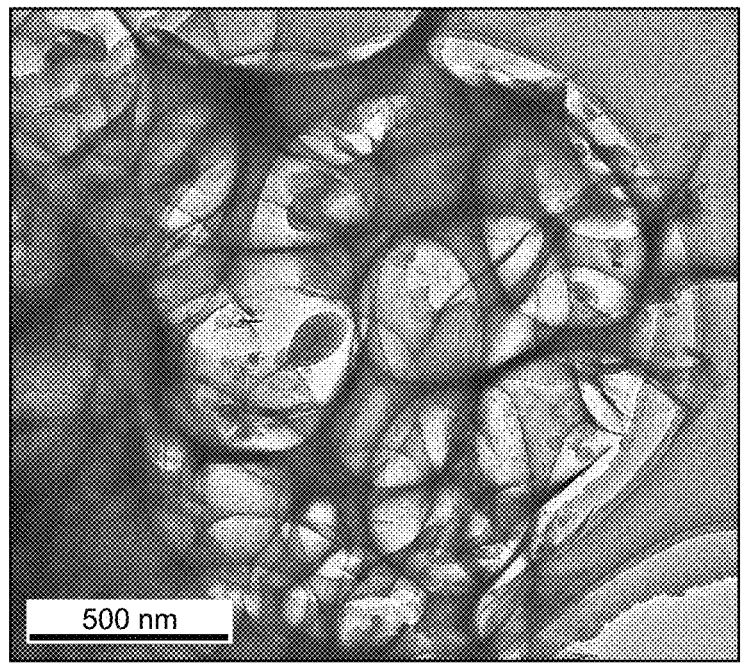
FIG. 3C shows a high-resolution transmission electron microscope (HRTEM) image of the C—KOH at 500 nm magnification, according to certain embodiments.
Figure 3D:
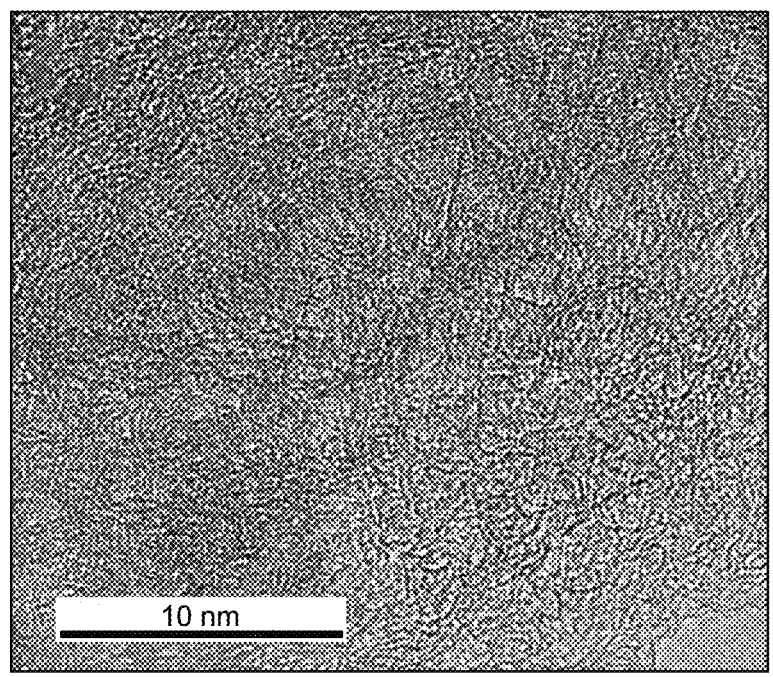
FIG. 3D shows an HRTEM image of the C—KOH at 10 nm magnification, according to certain embodiments.
Figure 3E:
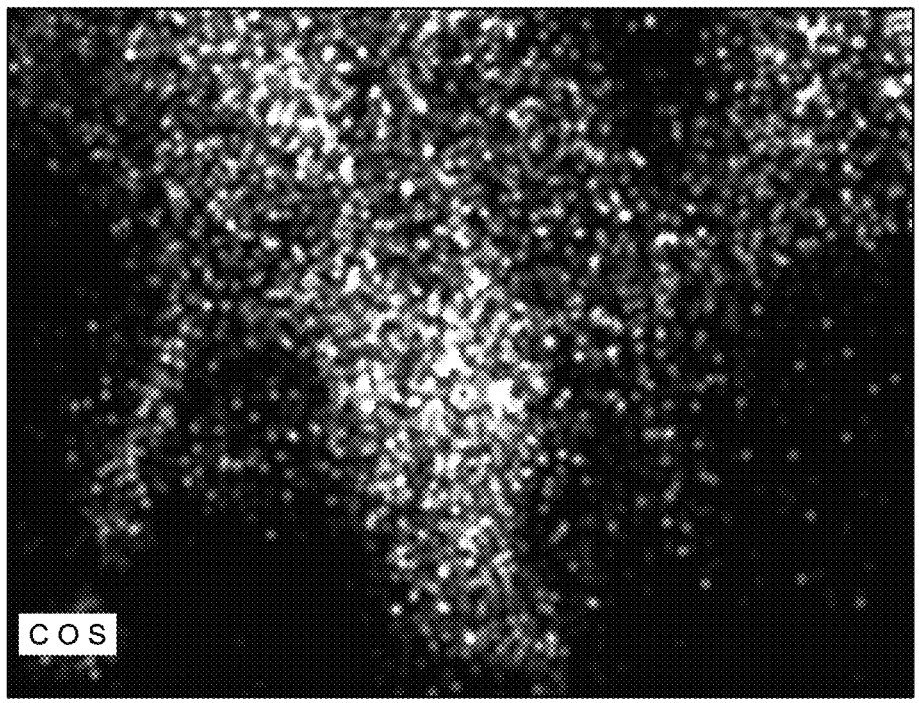
FIG. 3E shows an elemental mapping image for the C—KOH, according to certain embodiments.
Figure 3F:
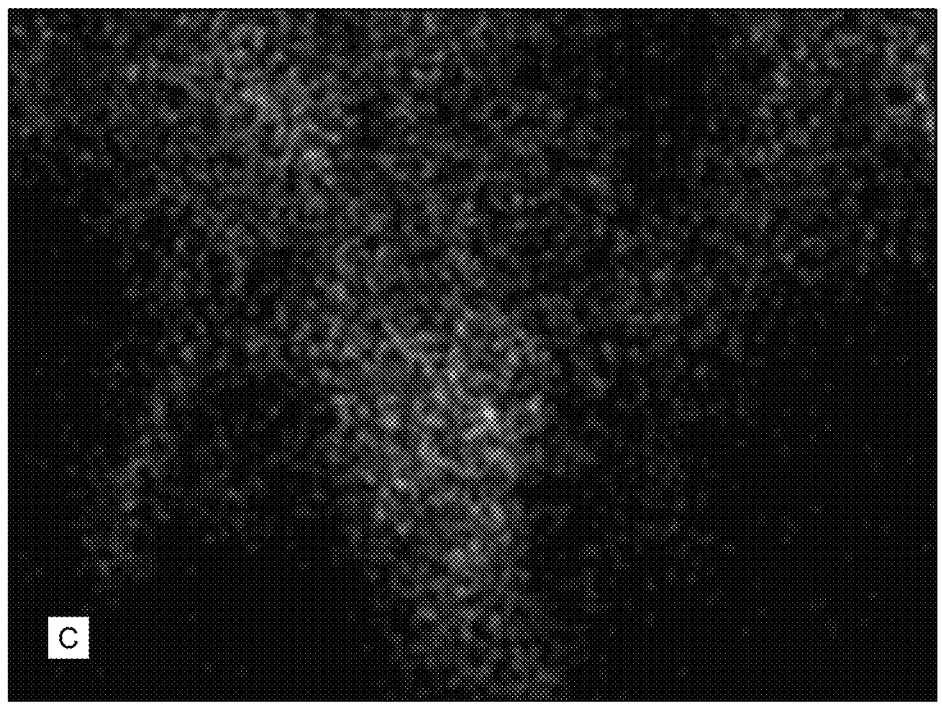
FIG. 3F shows an elemental mapping image for carbon in the C—KOH, according to certain embodiments.
Figure 3G:
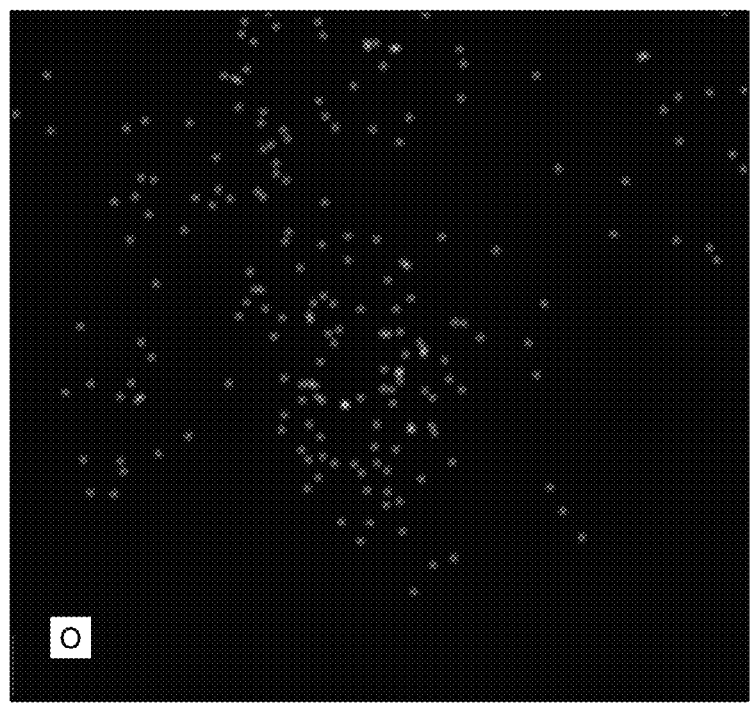
FIG. 3G shows an elemental mapping image for oxygen in the C—KOH, according to certain embodiments.
Figure 3H:
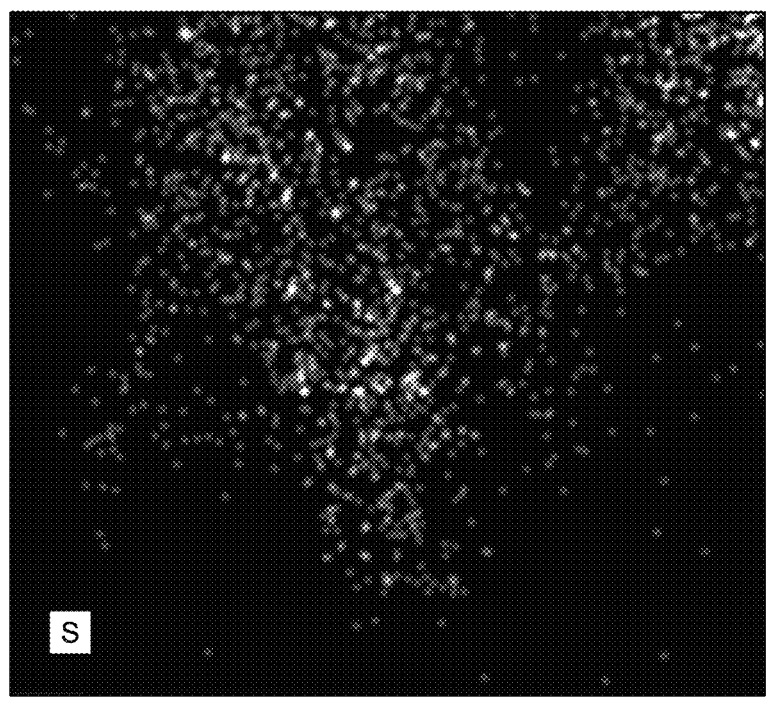
FIG. 3H shows an elemental mapping image for sulfur in the C—KOH, according to certain embodiments.

The microstructures of the C—KOH and C—KOH—H were also analyzed by SEM and HRTEM. SEM images for C—KOH at different magnifications show honeycomb-type morphology, which is generated due to the formation of pores after activation and washing processes (FIG. 3A and FIG. 3B). The HRTEM technique was used to further analyze the well-structured pores and amorphous nature of the C—KOH. FIG. 3C and FIG. 3D show clear pore formation, typical disordered amorphous nature, and multilayer two-dimensional type nanosheets. FIG. 3E shows an elemental mapping image for C—KOH. FIGS. 3F-3H shows elemental mapping images and endorses the even distribution of C, O, and S, respectively, in the as-prepared C—KOH.

Figure 4A:
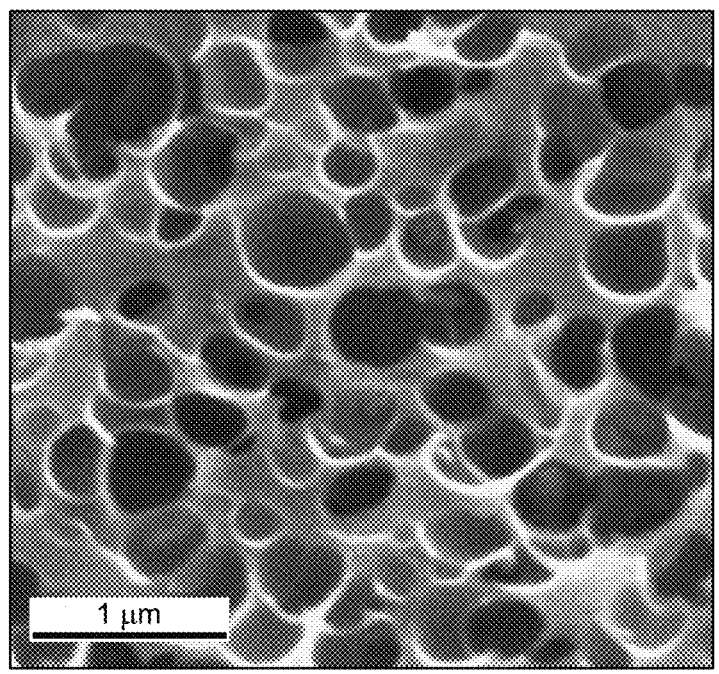
FIG. 4A shows an SEM image of the C—KOH—H at 1 μm magnification, according to certain embodiments.
Figure 4B:
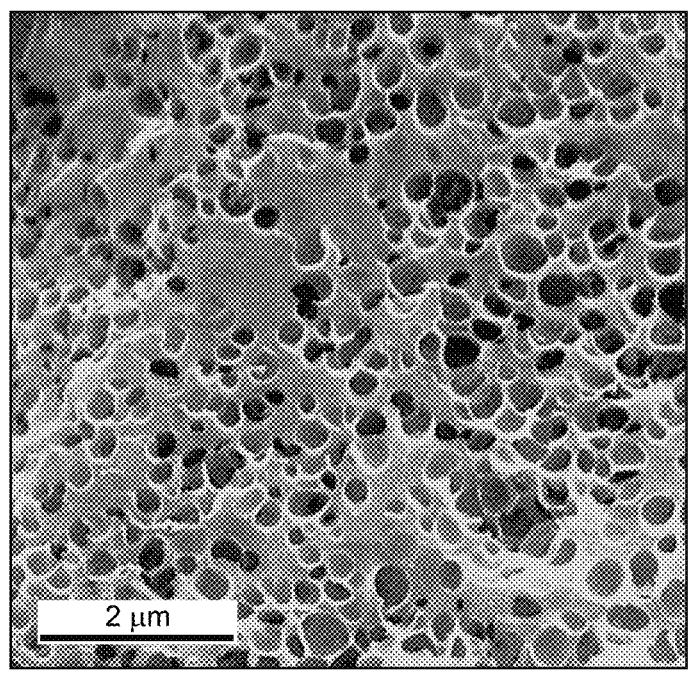
FIG. 4B shows an SEM image of the C—KOH—H at 2 μm magnification, according to certain embodiments.
Figure 4C:
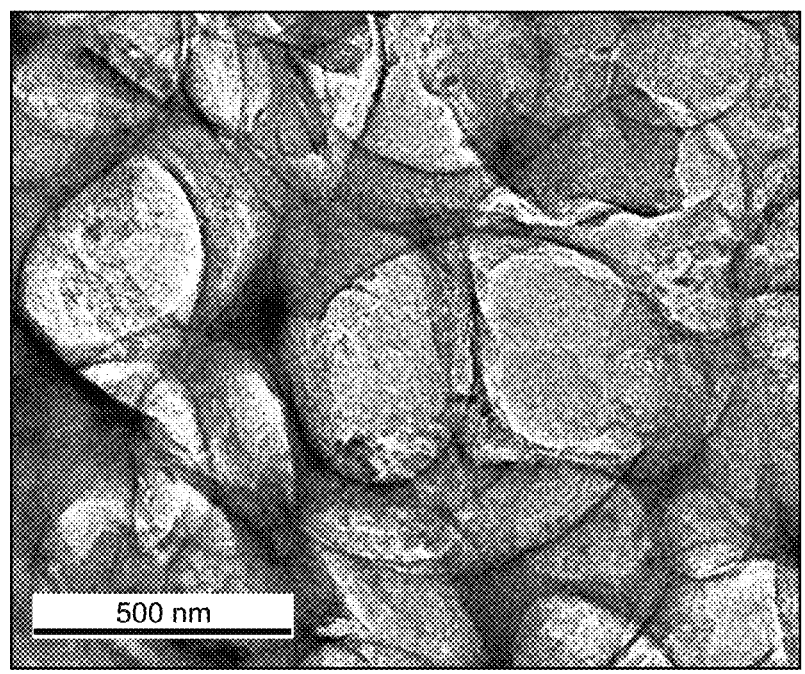
FIG. 4C shows an HRTEM image of the C—KOH—H at 500 nm magnification, according to certain embodiments.
Figure 4D:
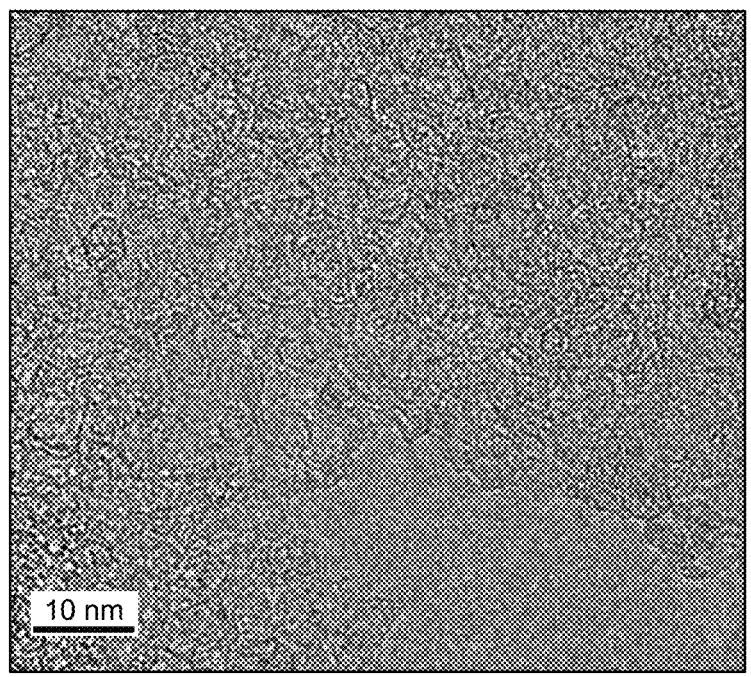
FIG. 4D shows an HRTEM image of the C—KOH—H at 10 nm magnification, according to certain embodiments.
Figure 4E:
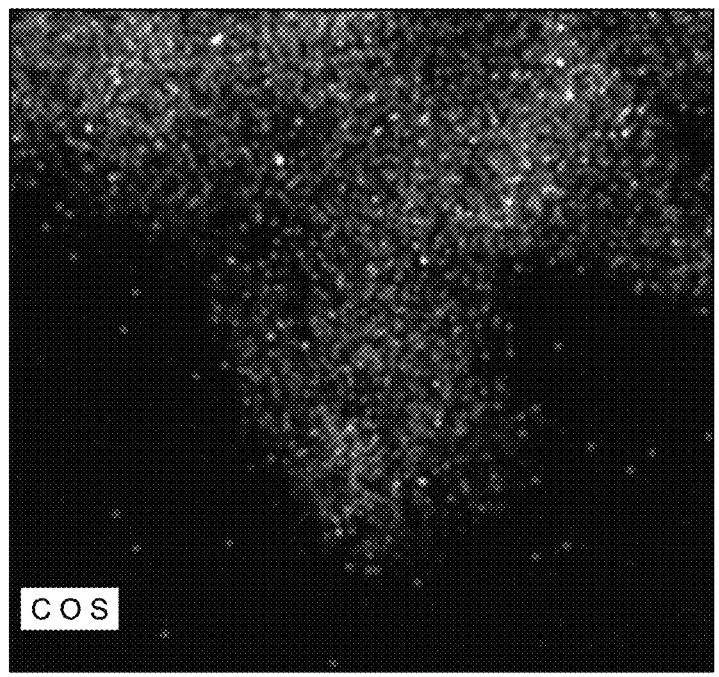
FIG. 4E shows an elemental mapping image for the C—KOH—H, according to certain embodiments.
Figure 4F:
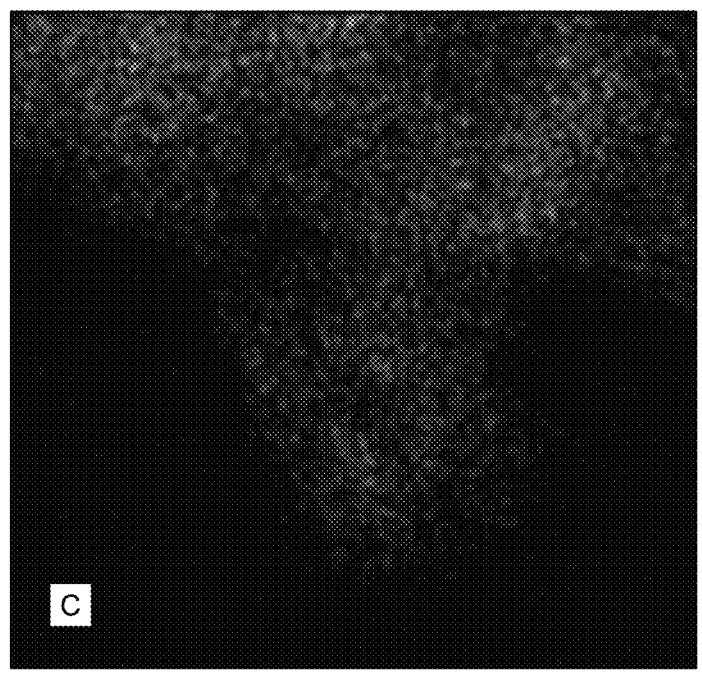
FIG. 4F shows an elemental mapping image for carbon in the C—KOH—H, according to certain embodiments.
Figure 4G:
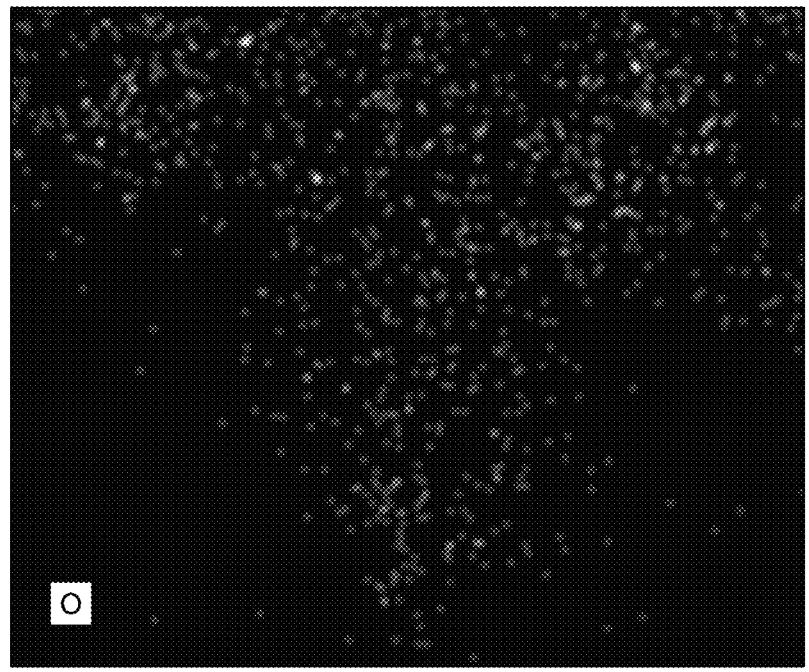
FIG. 4G shows an elemental mapping image for oxygen in the C—KOH—H, according to certain embodiments.
Figure 4H:
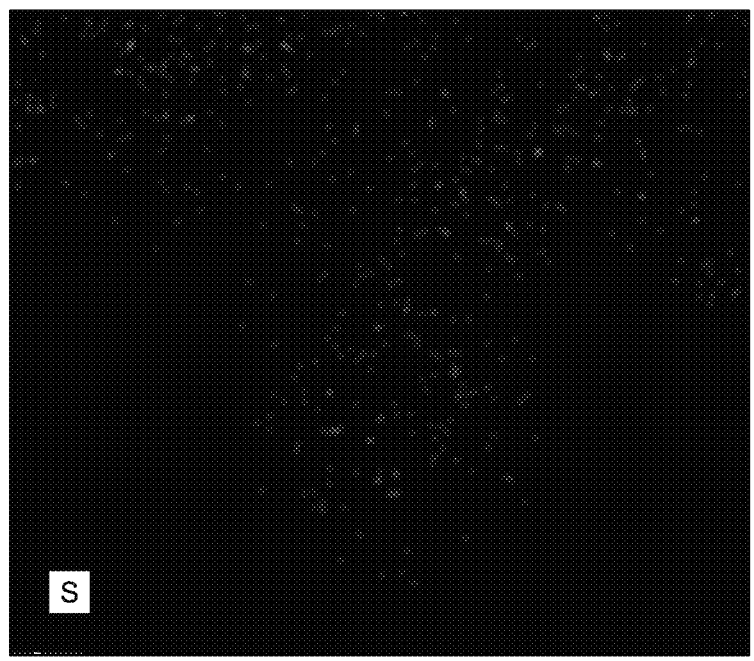
FIG. 4H shows an elemental mapping image for sulfur in the C—KOH—H, according to certain embodiments.

FIG. 4A and FIG. 4B shows SEM images, and FIG. 4C and FIG. 4D shows TEM images of the C—KOH—H at different magnifications. The C—KOH—H was achieved by the mild reduction of C—KOH with $H_2$ at 600° C. The microscopy images of C—KOH—H exhibit a porous pattern, too; however, a slight difference in the pattern of the pores was observed when compared to the C—KOH. These images show that during the mild reduction process, part of the oxygen and sulfur are removed and, due to this, the obtained morphology of the C—KOH is changed slightly without the structure collapse. In FIG. 4D, C—KOH—H exhibits disordered, two-dimensional, and multilayer sheet morphology like that of C—KOH. FIGS. 4E-4H illustrates the uniform elemental distribution and presence of C, O, and S, respectively, in the C—KOH—H. Elemental analysis shows that from PAQS to C—KOH—H, the carbon content increases and the amount of oxygen and hydrogen is reduced (Table 1).

TABLE 1

Elemental study of the PAQS, C-KOH, and C-KOH-H

| Samples | Elemental Analysis | | | |
|---|---|---|---|---|
| | C (%) | O (%) | H (%) | S (%) |
| PAOS | 63.63 | 19.24 | 1.80 | 6.27 |
| C-KOH | 75.56 | 17.40 | 1.26 | 5.78 |
| C-KOH-H | 79.67 | 12.33 | 1.10 | 4.82 |

Figure 5:
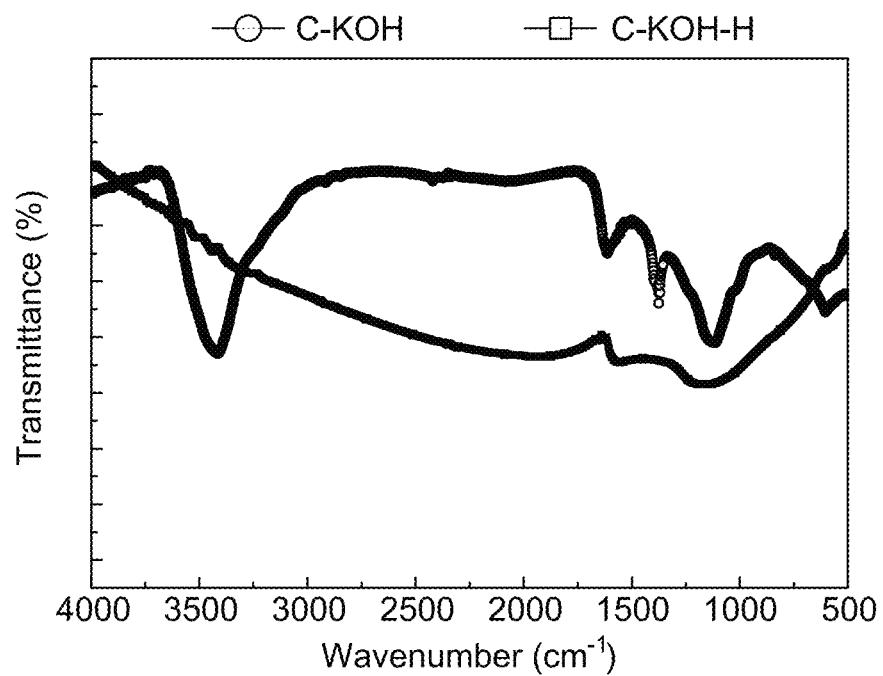
FIG. 5 shows a Fourier-transform infrared (FTIR) spectrum analysis for the C—KOH and the C—KOH—H, according to certain embodiments.
Figure 6:
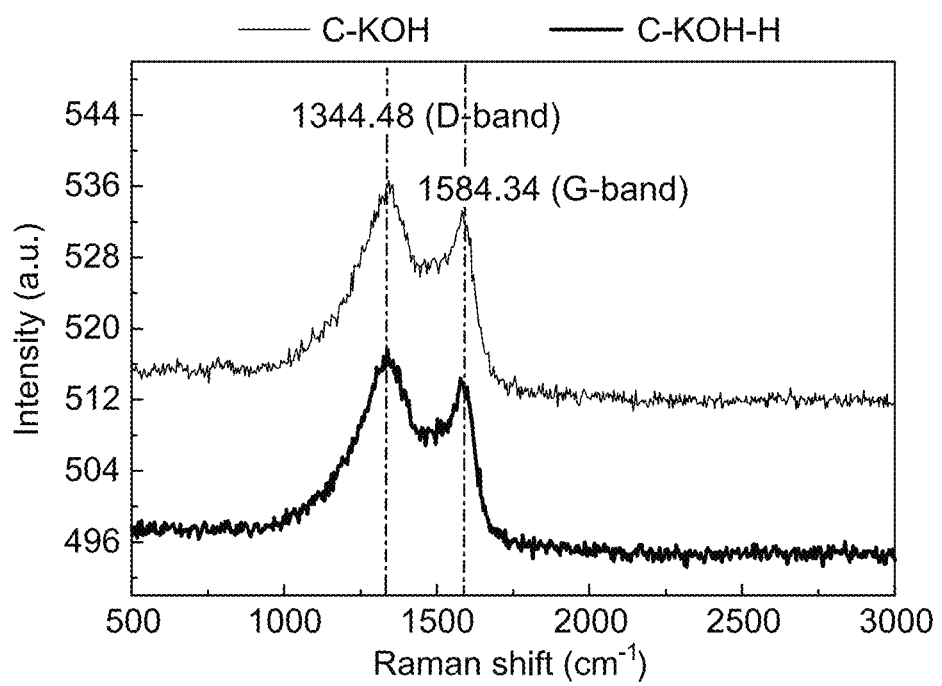
FIG. 6 shows a Raman spectroscopy analysis for the C—KOH and the C—KOH—H, according to certain embodiments.

FIG. 5 depicts the C—KOH and C—KOH—H FTIR spectra. An O—H group is identified by a pronounced signal at 3400 $cm^{-1}$ in the spectra of C—KOH. In the FTIR spectrum for C—KOH, additional notable peaks appear at 1600, 1400, and 1200 $cm^{-1}$, indicative of C=C, C—H, and organic sulfur, respectively. In the FTIR spectrum for C—KOH—H, disappearance or reduction in peak intensity indicate that a majority of the functional groups were lost. The functional groups persist at 1600 $cm^{-1}$ and 1200 $cm^{-1}$, indicative of C=C and organic sulfur groups. Raman spectroscopy is a method for ascertaining the characteristics of carbon-based materials, specifically their graphitic and defective configurations. The graphitic and defective nature of the C—KOH and C—KOH—H materials were determined through Raman spectroscopy, as shown in FIG. 6. The Raman spectra represent two prominent peaks for C—KOH and C—KOH—H at approximately 1584 $cm^{-1}$ and 1344 $cm^{-1}$, the graphite (G) and defect (D) bands of carbon, respectively. The G-band ascribes to $sp^2$ vibration among the C—C graphite plane and the D-band is linked to the double resonance process in defected carbon. The graphitic and disordered nature of the carbon materials is determined by the intensity ratio of D and G bands (ID/IG). A high-intensity ratio of ID/IG signifies the presence of a greater number of defects in the carbon sample. For the C—KOH and C—KOH—H the ratio of ID/IG=1.01, showing a more disordered nature and a less graphitic nature.

Figure 7:
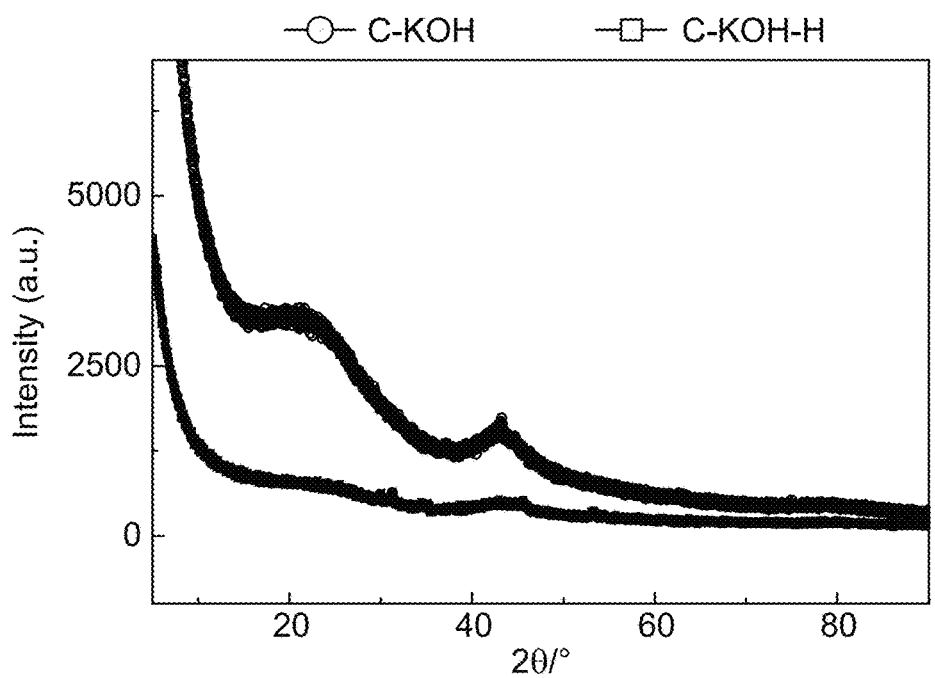
FIG. 7 shows X-ray diffraction (XRD) patterns for the C—KOH and the C—KOH—H, according to certain embodiments.
Figure 8:
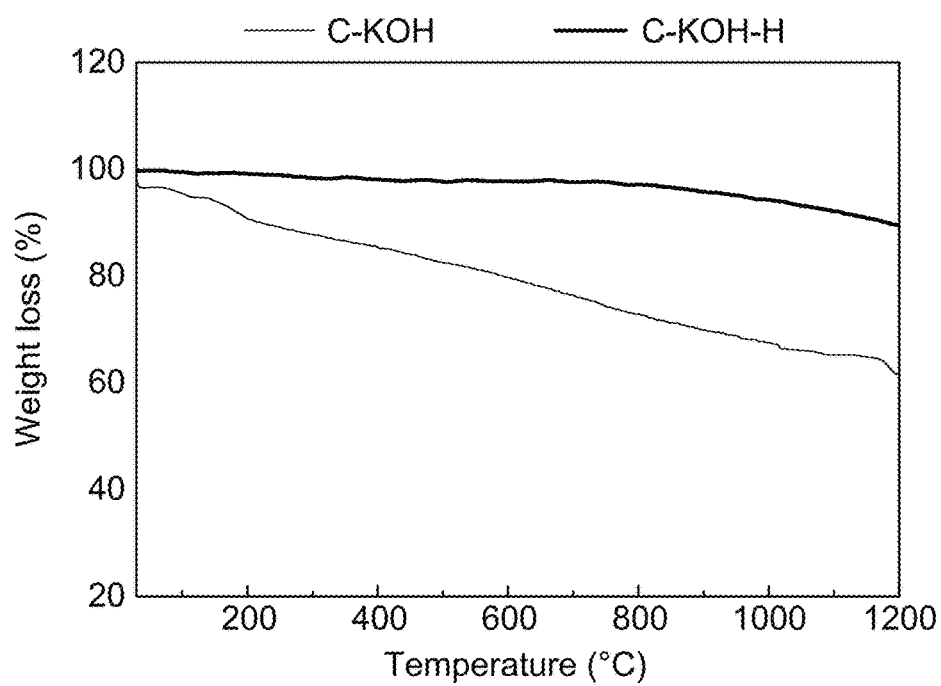
FIG. 8 shows a thermogravimetric (TGA) analysis for the C—KOH and the C—KOH—H, according to certain embodiments.

FIG. 7 depicts XRD spectra showing the amorphous nature of C—KOH and C—KOH—H, respectively. The XRD curves showed two prominent diffraction peaks at 2θ=22.4° (002) and an overlapped signal at 2θ=44° (101 & 100). These results indicate the XRD patterns of the C—KOH and C—KOH—H. No characteristic peaks for KOH were observed, confirming the purity of the C—KOH and C—KOH—H. TGA is used to determine the thermal stabilities of the synthesized materials (FIG. 8). Samples stability tests were performed till 1200° C. in a nitrogen environment with a heating rate of 5 degrees per minute. The results indicate that the reduced activated carbon loses weight gradually and retains 90% of the weight at a temperature of 1200° C. In contrast, the activated carbon achieved from direct activation shows rapid weight loss with 61% weight retention. Thus, the TGA analysis further demonstrates that C—KOH—H is a good choice for use in high-temperature applications.

Figure 9A:
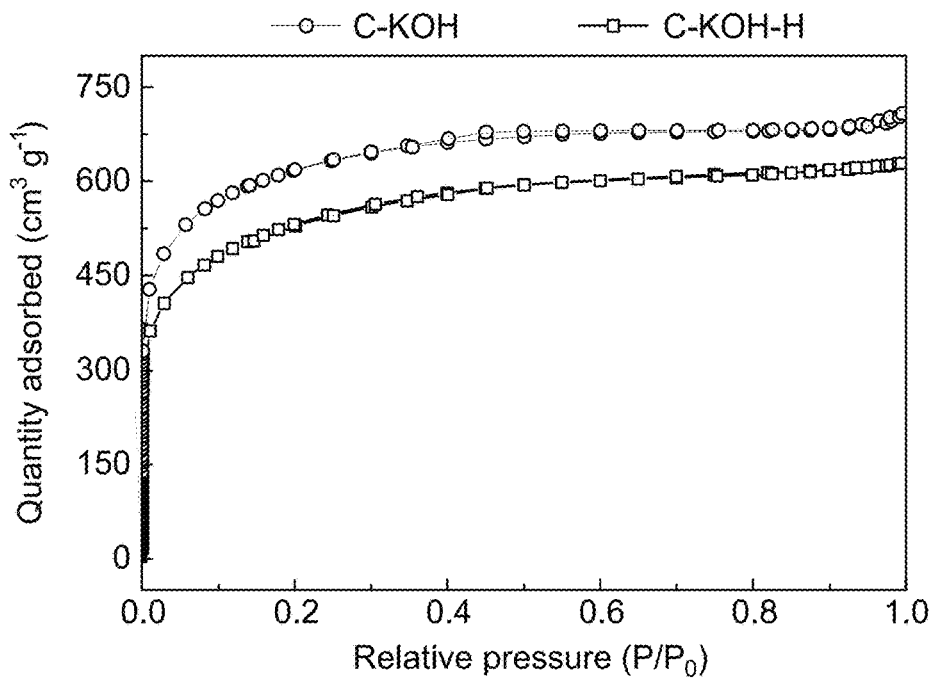
FIG. 9A shows Brunauer-Emmett-Teller (BET) isotherms for the C—KOH and the C—KOH—H via nitrogen adsorption-desorption isotherm curves, according to certain embodiments.
Figure 9B:
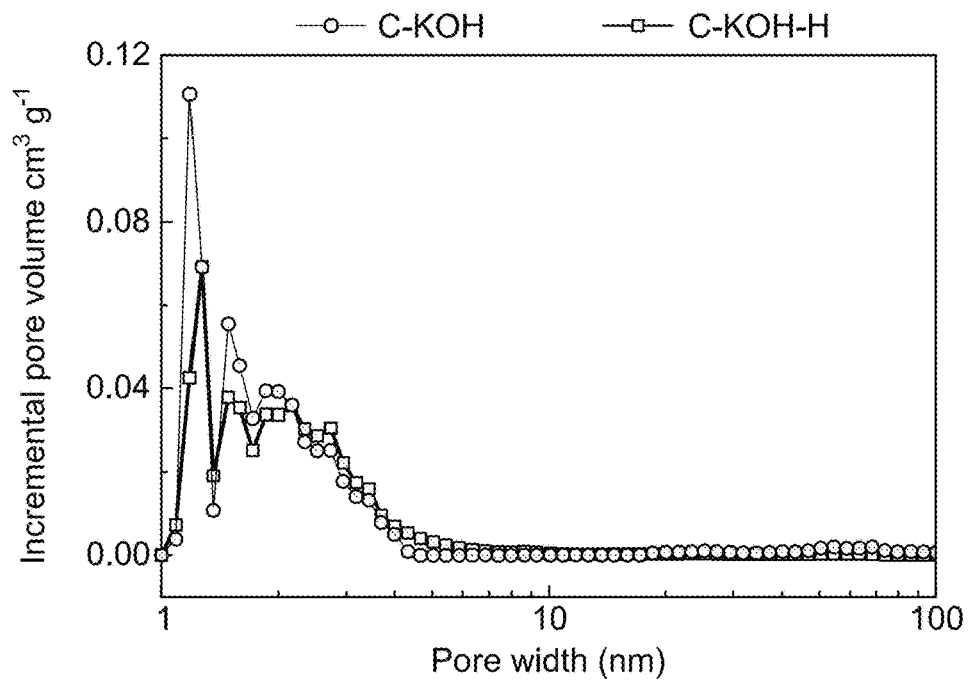
FIG. 9B shows a pore-size distribution analysis for the C—KOH and the C—KOH—H determined by Barrett-Joyner-Halenda (BJH) theory, according to certain embodiments.

The adsorption-desorption isotherm curves of the C—KOH and C—KOH—H are shown in FIG. 9A. The isotherms of both the samples show type IV curves. The isotherm patterns show the presence of micropores, mesopores, and macropores. The sharp vertical $N_2$ adsorption of the samples at low relative pressure ($P/P_0$) demonstrates micropores are in abundance. The hysteresis mesopores between $P/P_0$=0.4-0.6 illustrate a mesopore presence in the samples. The pore size distribution of the C—KOH and C—KOH—H was determined by Barrett-Joyner-Halenda (BJH). The BJH pore size distribution curve further justify the hierarchical porosity with micropores, mesopores, and macropores (FIG. 9B).

Figure 10A:
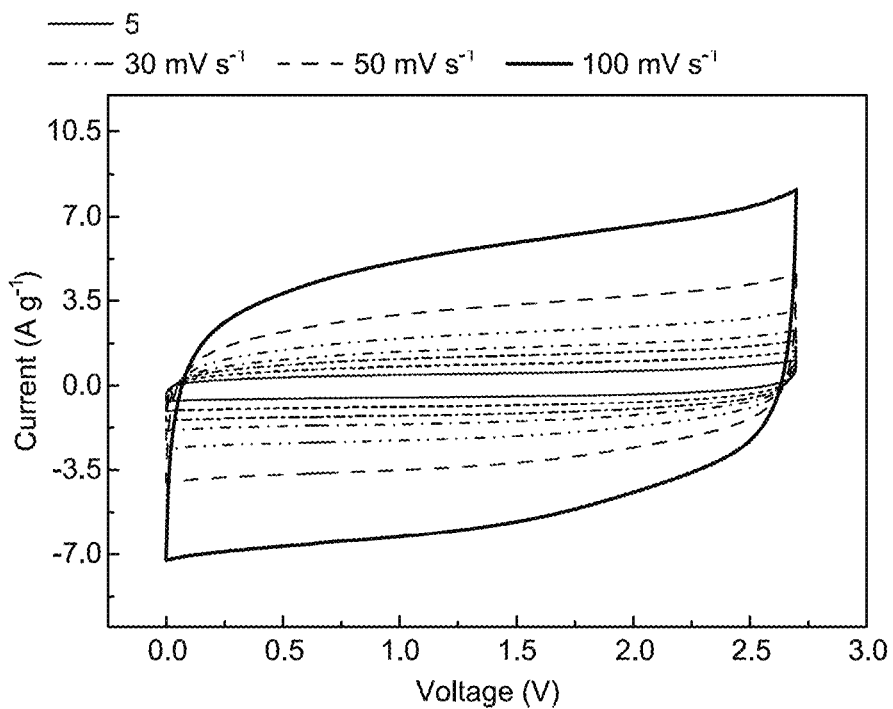
FIG. 10A shows voltammograms determined by cyclic voltammetry (CV) for the C—KOH, according to certain embodiments.
Figure 10B:
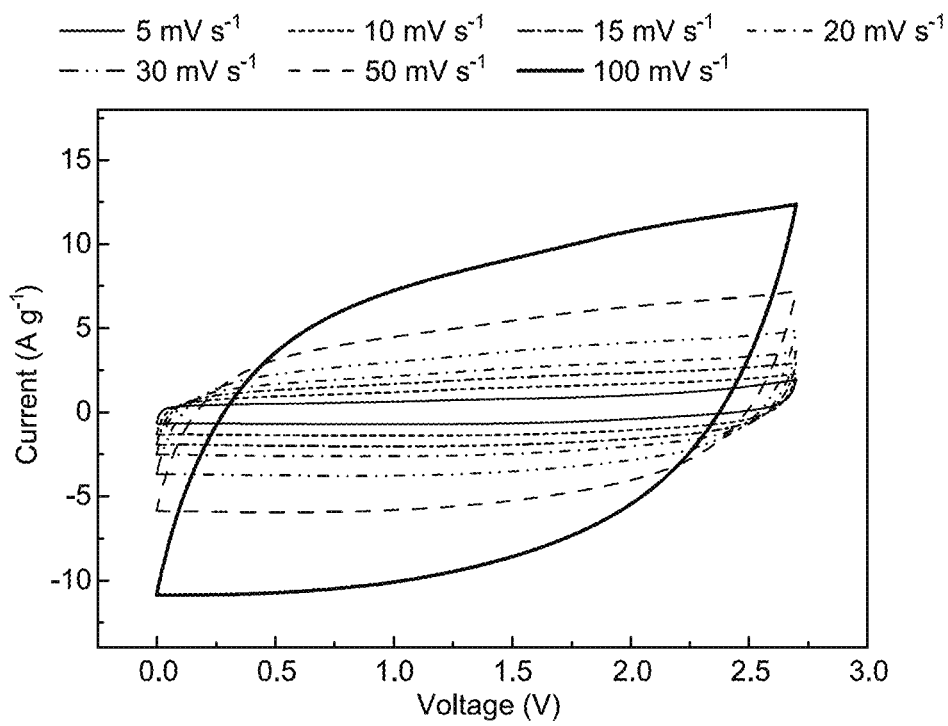
FIG. 10B shows voltammograms determined by CV for the C—KOH—H, according to certain embodiments.
Figure 10C:
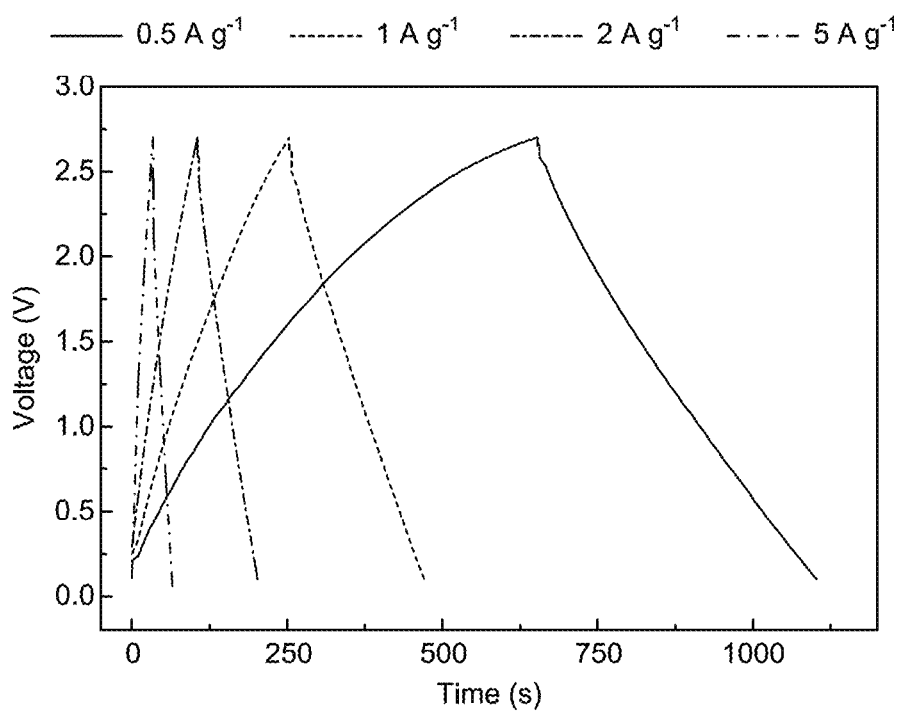
FIG. 10C shows galvanostatic charge/discharge (GCD) curves for the C—KOH, according to certain embodiments.
Figure 10D:
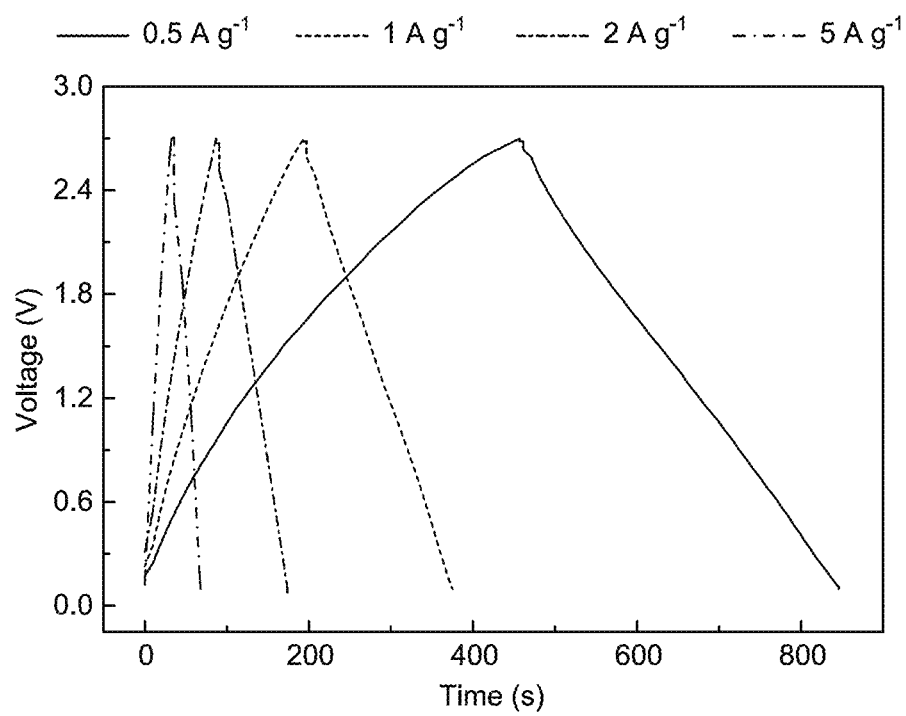
FIG. 10D shows GCD curves for the C—KOH—H, according to certain embodiments.

To determine the electrochemical double layer (EDL) behavior of the symmetric SCs assembled from C—KOH and C—KOH—H electrodes, cyclic voltammetry (CV) measurements were performed as depicted in FIG. 10A and FIG. 10B, respectively. The CV measurements were conducted for C—KOH and C—KOH—H-based SCs at scan rates of 5 mV/sec, 10 mV/sec, 15 mV/sec, 20 mV/sec, 30 mV/sec, 50 mV/sec, and 100 mV/sec. The operation voltage windows were kept between 0 and 2.7 V. Both the SCs displayed typical rectangular type voltammograms, which is a characteristic indication of the EDL formation on the carbon electrodes. The rectangular-shaped voltammograms for both the activated carbons does not exhibit a discernible peak caused by a faradaic redox reaction that is overlaid on the open-pore structure of the electrode material. This evidence justifies that the storing of charge is a direct result of the adsorption and desorption of electrolyte ions. Furthermore, the processes of charge and discharge occurring at the electrode-electrolyte interface (EEI) are reversible. The CV curves showed no obvious distortion, even at 100 mV s$^{-1}$. FIG. 10C and FIG. 10D illustrate the galvanostatic charge-discharge (GCD) curve profiles of C—KOH and C—KOH—H, respectively. The GCD profiles were assessed at various current densities, (0.5 to 5 A/g). The GCD profiles for C—KOH and C—KOH electrodes exhibit a distinct triangular shape with a small IR drop that is indicative of characteristic behavior observed in electric double layer capacitors (EDLCs). The GCD curves for both electrodes exhibit the same EDLC behavior as that observed in the CV tests. It is noted that SCs assembled from C—KOH took more discharge time, while the ones assembled from C—KOH—H showed fast charge-discharge times at different current densities.

Symmetric electrodes fabricated from C—KOH—H show beneficial behavior, which is attributed to the reduction in oxygen and sulfur content quantities in the material (Table 1). As the SC devices perform through a charge and discharge phenomenon, the numerical values presented are based on the discharge time obtained from the GCD curves at different current densities. Equations 1-3 were used to obtain the specific capacitance, energy density, and power density. The maximum specific capacitance delivered by the electrode fabricated from C—KOH is 174 F/g at a current density of 0.5 A/g. C—KOH—H showed a maximum specific capacitance of 177 F/g at a current density of 0.5 A/g. The CV curves did not show a large difference in performance; however, the GCD curves assisted in justifying the better performances of the C—KOH—H electrode due to high capacitance, short discharge time, and high energy density. The higher specific capacitance of the C—KOH—H is due to higher carbon content, less oxygen, and an appropriate quantity of self-doped sulfur.

Figure 11A:
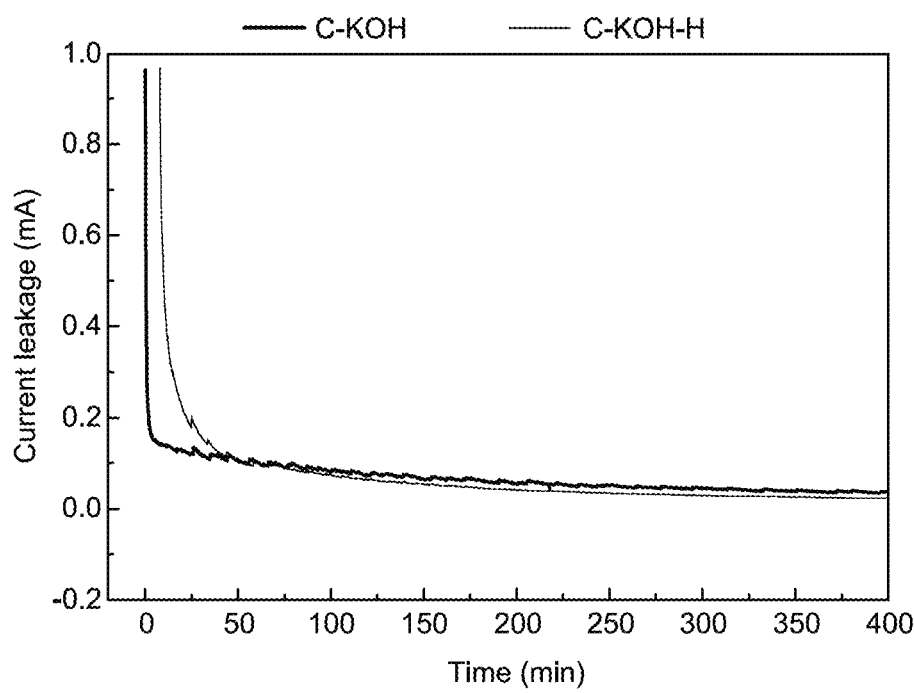
FIG. 11A is a plot showing current leakage for the C—KOH and the C—KOH—H, according to certain embodiments.

One disadvantage of EDLCs is current leakage. It is an unavoidable problem and usually leads to a decrease in the open-circuit voltage as time passes after the SCs have been charged. The SCs assembled from the C—KOH—H electrodes show a current leakage of 40 µA, while the SCs assembled from C—KOH electrodes show larger current leakage (60 µA) after 6.5 hours (FIG. 11A). The C—KOH—H electrodes give less current leakage than the C—KOH electrodes; however, the C—KOH electrodes perform better comparatively than the MgCoO$_4$@polypyrrole/Ni foam electrode, activated carbon electrode, activated carbon microspheres electrode, and porous film electrode, which have current leakage values of 86 µA, 92 µA, 150 µA, and 86 µA, respectively.

Figure 11B:
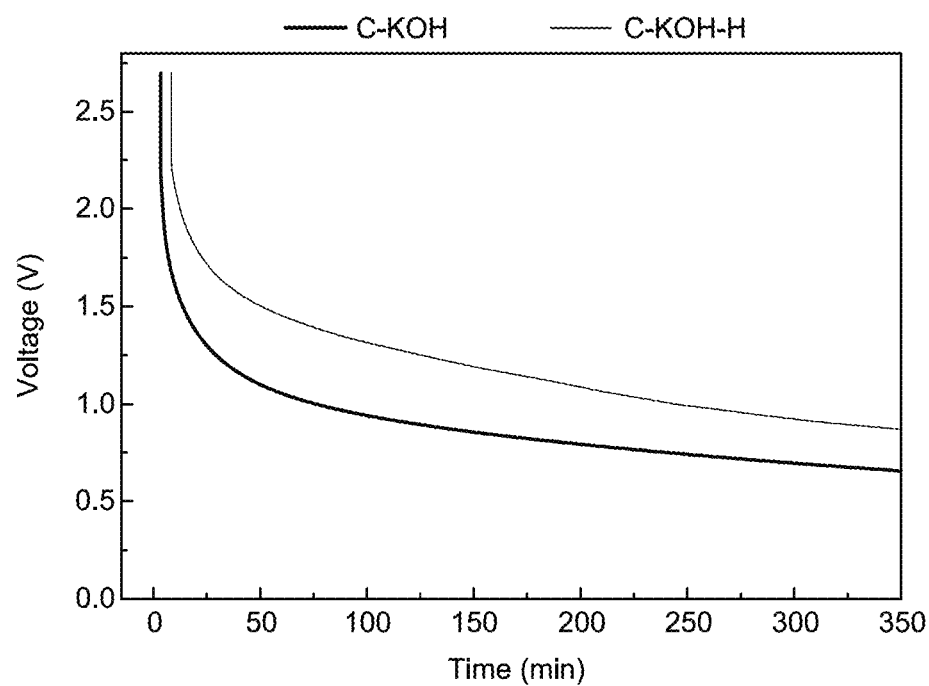
FIG. 11B is a plot showing potential retention for the C—KOH and the C—KOH—H, according to certain embodiments.

Self-discharging behavior is an unavoidable problem that leads to short circuits and the depletion of stored energy in SCs. To achieve a high-performance capacitor, the issue of self-discharging should be diminished. FIG. 11B presents the self-discharge conservation curves of the C—KOH and C—KOH—H electrodes. It is shown in FIG. 11B that the voltage of SCs assembled from C—KOH decreased to 0.66 V (~24%), after 6.5 hours, whereas SCs assembled with C—KOH—H electrodes maintained a voltage of 0.91 V (~34%). It was found that C—KOH—H electrodes showed more resistance against voltage drop when compared to the C—KOH electrodes. From the current leakage and self-discharge tests, the better performance of C—KOH—H electrodes compared to the C—KOH electrodes might be attributed to the quick ion transfer and lower resistance due to the presence of heteroatoms in fewer quantities.

Figure 11C:
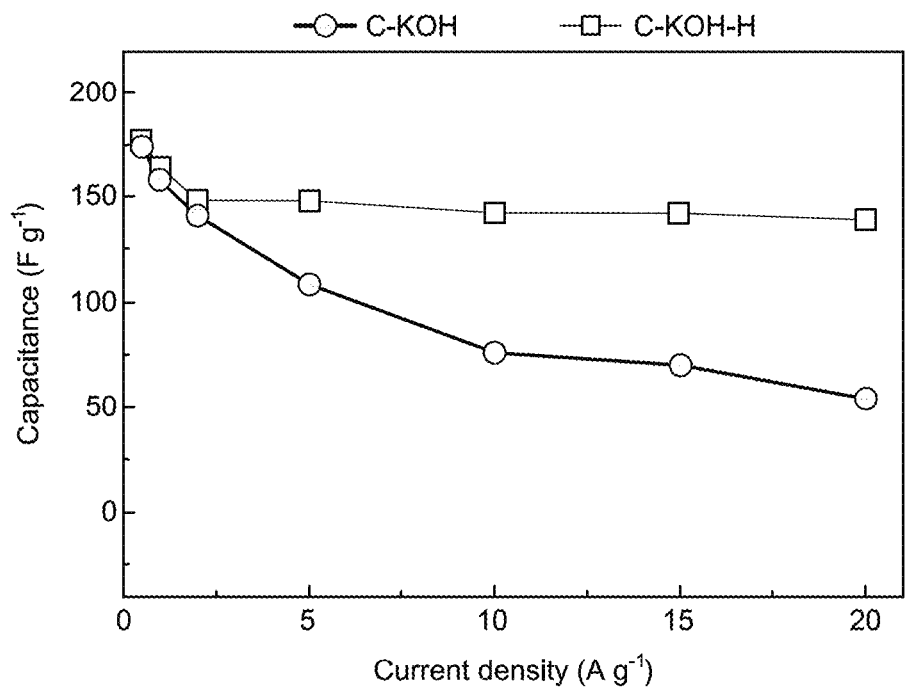
FIG. 11C is a plot showing rate performance for the C—KOH and the C—KOH—H, according to certain embodiments.
Figure 11D:
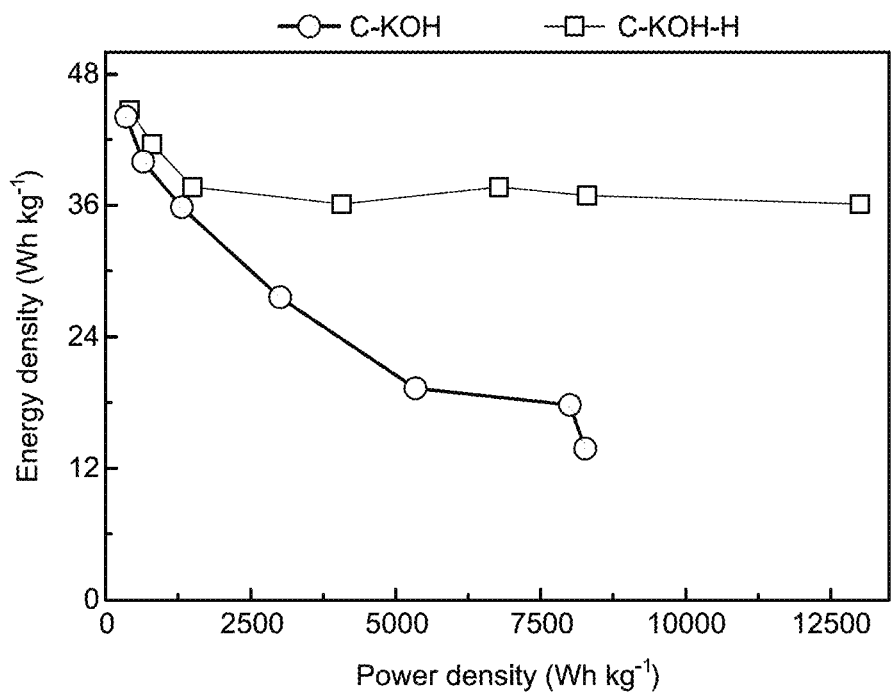
FIG. 11D shows a Ragone plot for the C—KOH and the C—KOH—H, according to certain embodiments.

Specific capacitance as a function of current density is depicted in FIG. 11C. The specific capacitances of C—KOH and C—KOH—H electrodes at 0.5 A/g were 174 F/g and 177 F/g, respectively. FIG. 11C shows that by increasing the current density from 0.5 A/g to 20 A/g, the specific capacitance of the C—KOH electrode decreased from 174 to 54 F/g. The specific capacitance of the C—KOH—H electrode showed good rate performances at higher current densities. The SCs assembled with C—KOH—H electrodes retained a specific capacitance of 140 F/g at 20 A/g. Overall, the SCs with C—KOH—H electrodes performed well at all the current densities. The decline in specific capacitance as current density increases is typically attributed to the cumulative duration of electrolyte ion movement within the pores of the material and a rise in material resistance. A lower current density suggests that electrolyte ions are afforded increased time for diffusion into the electrode materials, enabling a greater portion of the surface area of the electrode's active material to participate in charge storage. FIG. 11D illustrates the relationship between the energy density and power density, commonly referred to as the Ragone plot. The energy density of the C—KOH electrode is 44 Wh/kg at a power density of 350 W/kg; however, when the power density is increased to 8265 W/kg, the energy density in decreased to 13 Wh/kg. The C—KOH—H electrode exhibited an energy density of 45 Wh/kg at a power density of 410 W/kg and an energy density of 36.1 Wh/kg at a power density of 12997 W/kg. From the Ragone plot, it is shown that the energy stored in the C—KOH—H reserves a modest decrease with an increase in power density.

Figure 11E:
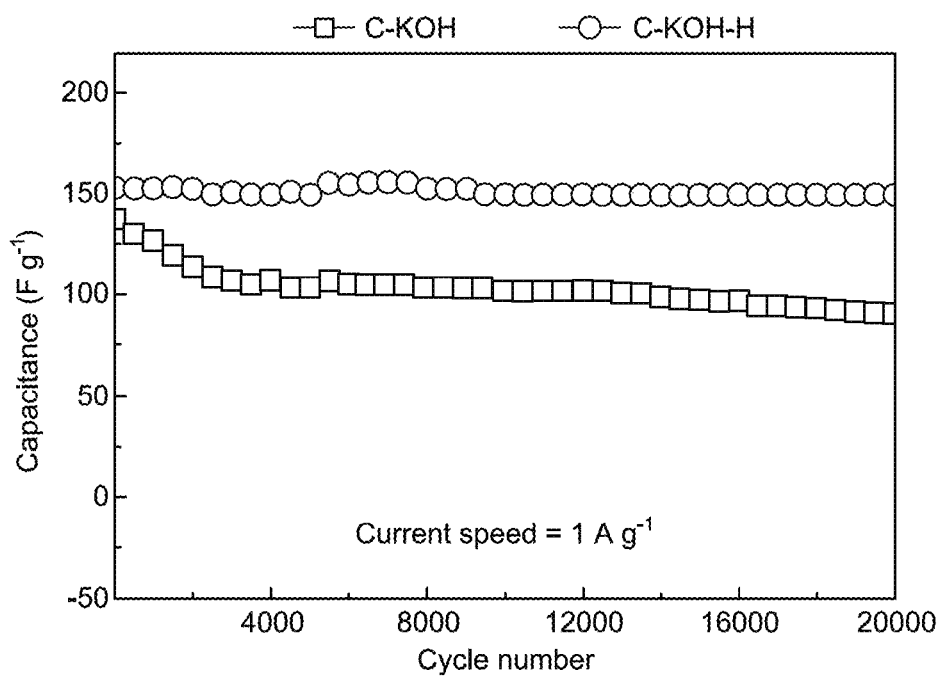
FIG. 11E is a plot showing the lifespan for the C—KOH and the C—KOH—H, according to certain embodiments.

When evaluating the efficacy of energy storage, the cyclic stability characteristics of electrode materials is considered. Consequently, the cycling stability performance of the SCs based on C—KOH and C—KOH—H was evaluated by subjecting the SCs to 20,000 repeated GCD cycles at a constant current density of 1 A/g. SCs composed of C—KOH—H electrodes delivered an initial capacitance of 152 F/g and after 20,000 continuous cycles it retained a capacitance of 149 F/g, which is 98% retention of the initial capacitance as revealed in FIG. 11E. In comparison to the C—KOH—H electrodes, SCs consisting of C—KOH electrodes give an initial capacitance of 137 F/g at 1 A/g and retain a capacitance of 90 F/g after 20,000 cycles. This is a coulombic efficiency of about 66%. These findings reveal that the reduced activated carbon performs better than the non-reduced activated carbon. The cyclic stability of C—KOH—H is well matched with its rate performance at various current densities. The C—KOH—H-based SCs demonstrated consistency in terms of overall performance compared to the C—KOH assembled SCs.

Figure 11F:
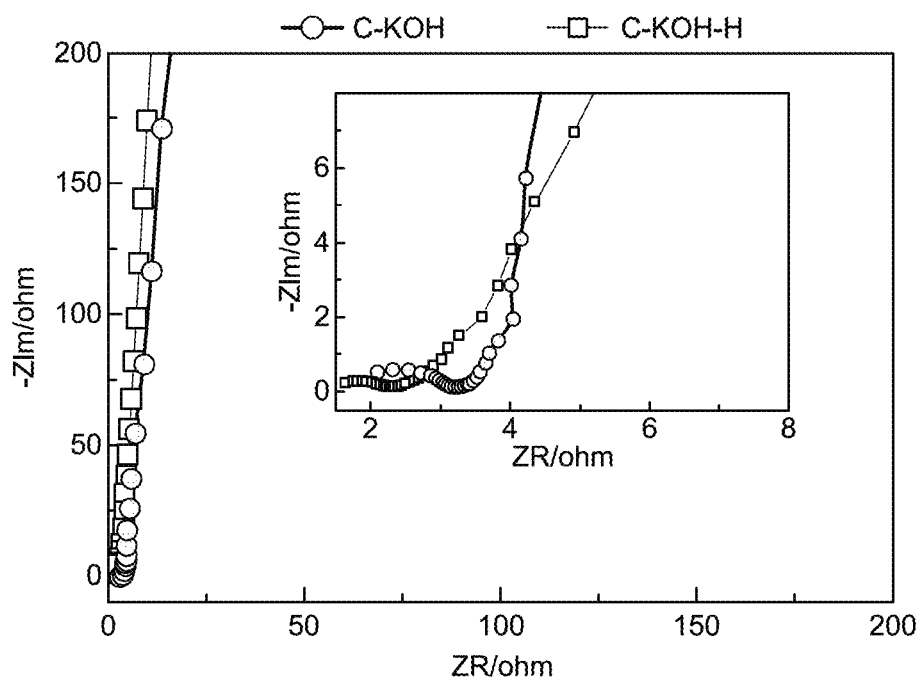
FIG. 11F shows a Nyquist plot for the C—KOH and the C—KOH—H, according to certain embodiments.

Electrochemical impedance spectroscopy (EIS) technique is utilized to examine the electron/ion transport mechanism and the diffusion kinetics of the assembled symmetric supercapacitor. The electrode resistances were determined through EIS using Nyquist plots. The Nyquist plots of the functioning electrodes revealed two major regions: The first region is a semicircle related to the electron transfer process in the high-frequency region called charge transfer resistance ($R_{ct}$). An approximately vertical line in the low-frequency area is seen, endorsing good capacitive behavior of the EDLCs because of the high porous volume and large pore size distribution. FIG. 11F and its inset (semi-circle in the high-frequency region) show the Nyquist plot for both the C—KOH—H and C—KOH. The inset in FIG. 11F shows that the C—KOH—H possesses a smaller semi-circle than the C—KOH, suggesting a smaller resistance. It is observed from the Nyquist plots that the Ret values for C—KOH and C—KOH—H are 3.2Ω and 2.2Ω, respectively. The smaller Ret for C—KOH—H indicates good electron transmission and fast ion migration among the electrolyte and electrode interface. This behavior was observed in the high-frequency region, indicating that ion transport is efficient.

Reducing oxygen species has been seen to improve the electrical conductivity and electrochemical performance of carbon materials [Byon, H. R.; Gallant, B. M.; Lee, S. W.; Shao-Horn, Y. Role of Oxygen Functional Groups in Carbon Nanotube/Graphene Freestanding Electrodes for High Performance Lithium Batteries. *Adv. Funct. Mater.* 2013, 23, 1037-1045, which is incorporated herein by reference in its entirety]; however, not all oxygen sites in carbon materials adversely affect reversible capacitance. Some oxygen functional groups, like carboxyl, ketone, and ester, offer active sites, which facilitate the reversible adsorption and desorption of electrolyte ions. Precise changes occurring in oxygen functional groups during the $H_2$ reduction process remain uncertain, and their impacts on electrolyte storage have not yet been recognized; however, the mild $H_2$ reduction and preparation of C—KOH to C—KOH—H demonstrate improvement in the overall electrochemical performance.

A chemical activation method was used to prepare C—KOH from PAQS. A mild $H_2$ reduction at low temperatures was used to obtain C—KOH—H from C—KOH. The C—KOH and C—KOH—H exhibited specific surface areas of 2221 and 1870 $m_2 g^{-1}$, respectively. The decrease in SSAs was due to the removal of sulfur and oxygen (Table 1) during the reduction process, which led to textural changes without structure collapse. The SEM and HRTEM images showed the well-organized pore formations on layer-type multiple sheets of the C—KOH and C—KOH—H. The mild $H_2$ reduction has demonstrated improved electrochemical performances of the C—KOH—H over the C—KOH. Electrochemical analyses indicate that the C—KOH—H exhibits a specific capacitance of 177 F/g at a current density of 0.5 A/g and an energy density of 45 Wh/kg at 410 W/kg power density. A specific capacitance of 174 F/g is achieved at a current density of 0.5 A/g and an energy density of 44 Wh/kg with a power density of 350 W/kg for the C—KOH electrode. The C—KOH—H electrode holds a specific capacitance of 139 F/g even at a high current density of 20 A/g, demonstrating its high rate performance over the C—KOH electrode (specific capacitance of 54 F/g at a current density of 20 A/g). C—KOH—H electrodes retained 98% of the initial capacitance at 1 A/g over 20,000 cycles. Furthermore, the C—KOH—H electrode offered less current leakage, higher voltage stability, and less charge transfer resistance. The favorable structural and electrochemical performances of the C—KOH—H electrode in SCs were due to the removal/evolution of oxygen functional groups during the mild $H_2$ reduction process. A mild $H_2$ reduction step demonstrates improvement in the overall electrochemical performance of the carbon material without structure collapse. This strategy opens new ways to introduce activated carbons from heteroatom synthetic polymers with reproducible structure and composition.

Numerous modifications and variations of the present disclosure are possible in light of the above teachings. It is therefore to be understood that within the scope of the appended claims, the disclosure may be practiced otherwise than as specifically described herein.

The invention claimed is:

1. A supercapacitor, comprising:
   a negative electrode comprising a carbon material and a substrate, wherein the carbon material is at least one selected from the group consisting of a poly-anthraquinone sulfide activated carbon material and a poly-anthraquinone sulfide reduced activated carbon material, and wherein the carbon material is coated on the substrate and the substrate is a metal foil;
   a positive electrode comprising a carbon material and a substrate, wherein the carbon material is at least one selected from the group consisting of a poly-anthraquinone sulfide activated carbon material and a poly-anthraquinone sulfide reduced activated carbon material, and wherein the carbon material is coated on the substrate and the substrate is a metal foil;
   an electrolyte;
   a separator,
   wherein the separator is between the negative electrode and the positive electrode, and the electrolyte is present in and on the separator.

2. The supercapacitor of claim 1, wherein the carbon material is the poly-anthraquinone sulfide activated carbon material made by a process, comprising:
   mixing poly-anthraquinone sulfide with a base in water to form a mixture,
   wherein the poly-anthraquinone sulfide and the base has a weight ratio of 1:1 to 1:10,
   heating the mixture to a first temperature of 130 to 170° C. for 40 to 56 hours; and
   heating the mixture to a second temperature of 800 to 900° C. for 30 to 90 minutes in an inert environment to form the poly-anthraquinone sulfide activated carbon material.

3. The supercapacitor of claim 1, wherein the carbon material is the poly-anthraquinone sulfide reduced activated carbon material made by a process comprising:
   heating the poly-anthraquinone sulfide activated carbon material at a temperature of 550 to 650° C. for 30 to 90 minutes in an environment of 85 to 95 percent argon and 5 to 15 percent hydrogen gas to form the poly-anthraquinone sulfide reduced activated carbon material.

4. The supercapacitor of claim 1, wherein the carbon material is poly-anthraquinone sulfide activated carbon material and the substrate is an aluminum foil, wherein the carbon material has a specific surface area of 2200 to 2250 m²/g.

5. The supercapacitor of claim 1, wherein the carbon material is poly-anthraquinone sulfide reduced activated carbon material and the substrate is an aluminum foil, wherein the carbon material has a specific surface area of 1850 to 1900 m²/g.

6. The supercapacitor of claim 1, wherein the carbon material of the negative electrode and the positive electrode is poly-anthraquinone sulfide reduced activated carbon material, the substrate is an aluminum foil, and the supercapacitor has a specific capacitance of 130 to 150 F/g at a current density of 15 to 25 A/g.

7. The supercapacitor of claim 1, wherein the carbon material of the negative electrode and the positive electrode is poly-anthraquinone sulfide activated carbon material, the substrate is an aluminum foil, and the supercapacitor has a specific capacitance of 50 to 60 F/g at a current density of 15 to 25 A/g.

8. The supercapacitor of claim 1, wherein the carbon material of the negative electrode and the positive electrode is poly-anthraquinone sulfide reduced activated carbon material, the substrate is an aluminum foil, and the supercapacitor retains 97 to 99% of an initial capacitance value after 20,000 charge and discharge cycles at a current density of 1 A/g.

9. The supercapacitor of claim 1, wherein the carbon material of the negative electrode and the positive electrode is poly-anthraquinone sulfide activated carbon material, the substrate is an aluminum foil, and the supercapacitor retains 63 to 69% of an initial capacitance value after 20,000 charge and discharge cycles at a current density of 1 A/g.

10. The supercapacitor of claim 1, wherein the negative electrode and the positive electrode comprise the poly-anthraquinone sulfide reduced activated carbon material on an aluminum foil, and the capacitor has a specific capacitance of 175 to 180 F/g at a current density of 0.5 A/g.

11. The supercapacitor of claim 1, wherein the negative electrode and the positive electrode comprise the poly-anthraquinone sulfide activated carbon material on an aluminum foil and the capacitor has a specific capacitance of 170 to 175 F/g at a current density of 0.5 A/g.

12. The supercapacitor of claim 1, wherein the negative electrode and the positive electrode comprise the poly-anthraquinone sulfide reduced activated carbon material on an aluminum foil and the capacitor has an energy density of 40 to 50 Wh/kg at a power density of 410 W/kg.

13. The supercapacitor of claim 1, wherein the negative electrode and the positive electrode comprise the poly-anthraquinone sulfide activated carbon material on an aluminum foil and the capacitor has an energy density of 40 to 50 Wh/kg at a power density of 350 W/kg.

14. The supercapacitor of claim 1, wherein the electrolyte is a spiro-(1,1')-bipyrolidinium tetrafluoroborate in a propylene carbonate.

15. The supercapacitor of claim 1, wherein the separator is a trilayered microporous membrane of polypropylene, polyethylene, and polypropylene.

16. The supercapacitor of claim 1, wherein the negative electrode and the positive electrode further comprises carbon black, a styrene butadiene, and a carboxymethyl cellulose.

17. The supercapacitor of claim 1, wherein the negative electrode and the positive electrode is made by a process, comprising:
 mixing the carbon material, carbon black, styrene butadiene, and carboxymethyl cellulose in water to form a paste,
 wherein the carbon material is in an amount of 65 to 75 percent by weight, the carbon black is in an amount of 15 to 25 percent by weight, the styrene butadiene is in an amount of 2 to 8 percent by weight, and the carboxymethyl cellulose is in an amount of 5 to 15 percent by weight,
 casting the paste on the substrate,
 wherein the substrate is an aluminum foil to form the negative electrode and the positive electrode.

18. The supercapacitor of claim 1, wherein the negative electrode and the positive electrode have a longest dimension of 10 to 12 mm.

19. The supercapacitor of claim 1, wherein the poly-anthraquinone sulfide activated carbon material is in the form of layered nanosheets having pores with an average diameter of 0.5 to 1.5 μm.

20. The supercapacitor of claim 1, wherein the poly-anthraquinone sulfide reduced activated carbon material is in the form of layered nanosheets having pores with an average diameter of 0.2 to 0.8 μm.

* * * * *